US008205795B2

(12) United States Patent
Kurasaki et al.

(10) Patent No.: US 8,205,795 B2

(45) Date of Patent: Jun. 26, 2012

(54) COMMUNICATION DEVICE, REMOTE SERVER, TERMINAL DEVICE, FINANCIAL CARD ISSUE SYSTEM, FINANCIAL CARD AUTHENTICATION SYSTEM, AND PROGRAM

(75) Inventors: Toshiya Kurasaki, Tokyo (JP); Hideaki Kihara, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 786 days.

(21) Appl. No.: 12/336,661

(22) Filed: Dec. 17, 2008

(65) Prior Publication Data

US 2009/0101707 A1 Apr. 23, 2009

(30) Foreign Application Priority Data

Dec. 28, 2007 (JP) ................................ 2007-340799

(51) Int. Cl.
*G06K 5/00* (2006.01)

(52) U.S. Cl. ......................... 235/380; 235/375; 235/487

(58) Field of Classification Search .................. 235/375, 235/380, 382, 385, 487, 494

See application file for complete search history.

(56) References Cited

U.S. PATENT DOCUMENTS

| | | | | |
|---|---|---|---|---|
| 4,816,653 A * | 3/1989 | Anderl et al. | ................ | 235/380 |
| 2007/0079144 A1 * | 4/2007 | Takada et al. | ................ | 713/193 |

FOREIGN PATENT DOCUMENTS

| | | |
|---|---|---|
| JP | 7-334590 | 12/1995 |

* cited by examiner

*Primary Examiner* — Karl D. Frech

(74) *Attorney, Agent, or Firm* — Finnegan, Henderson, Farabow, Garrett & Dunner, L.L.P.

(57) ABSTRACT

A communication device, a remote server, a terminal device, a financial card issue system, a financial card authentication system, and a computer-readable storage medium for authenticating card information. In one embodiment, a communication device incorporates an IC chip. The communication device may be connected to a financial institution server and a remote server through a network. The communication device may include a card issue request portion for requesting the financial institution server to issue a first card; a card information write request portion for receiving first card information corresponding to the first card from the financial institution server and requesting the remote server to write the first card information; and a storage portion including a first individual area, a second individual area, and a common area.

28 Claims, 14 Drawing Sheets

FIG.3

150

| AREA CODE (1502) | AREA NAME (1504) | DATA NAME (1506) | SERVICE CODE (1508) | STORED DATA (1510) |
|---|---|---|---|---|
| 0000 | INDEX AREA | | 0000 | 1000,3000<br>KEY VALUE 1<br>KEY VALUE 2 |
| 1000 | CARD INFORMATION 1 | CARD NUMBER | 1001 | 111-1111111 |
| | | NAME | 1002 | YAMADA |
| 3000 | CARD INFORMATION 2 | CARD NUMBER | 3001 | 222-2222222 |
| | | NAME | 3002 | YAMADA |

INDEX AREA ENCRYPTION KEY/ SIGNATURE KEY

INDIVIDUAL ENCRYPTION KEY 1

INDIVIDUAL ENCRYPTION KEY 2

COMMUNICATION DEVICE, REMOTE SERVER, TERMINAL DEVICE, FINANCIAL CARD ISSUE SYSTEM, FINANCIAL CARD AUTHENTICATION SYSTEM, AND PROGRAM

CROSS REFERENCE

This application contains subject matter related to Japanese Patent Application JP 2007-243453, filed in the Japan Patent Office on Sep. 20, 2007, the contents of which are incorporated herein by reference.

TECHNICAL FIELD

The present invention relates to a communication device, a remote server, a terminal device, a financial card issue system, a financial card authentication system, and a program. Specifically, the invention relates to authenticating card information via a network terminal.

BACKGROUND INFORMATION

In general, ATMs (Automated Teller Machines) of financial institutions may be used by means of a card, such as a magnetic card or an IC (Integrated Circuit) card, and a personal identification number. It is possible to use the ATMs to make cash deposits, cash withdrawals, balance inquiries, direct deposits, account transfers, etc.

Recently, it has become possible to perform transactions, such as balance inquiries, direct deposits, and account transfers, not only at an ATM that is located at a financial institution, but also at a remote terminal device or a portable terminal connected to a network to perform a process related to an account that is opened at a financial institution. When performing such a transaction via a network, it is usually necessary to have a user ID or a password for exclusive use in any transaction via a network. Further, in some cases, a financial institution provides a user with a second personal identification number or a third personal identification number, which are different from a personal identification number used with a card at an ATM, for personal identification.

A user ID or a password and the second personal identification number and/or the third personal identification number may be stored and managed individually in the system of each financial institution. This authentication information may be issued separately from a card number and a personal identification number of a card that are used in an ATM. A user can conduct a transaction via a network by logging-in using the authentication information that is necessary for each financial institution.

The data format of a card to be used for a transaction at an ATM is standardized so that data can be read or written commonly in ATMs of different financial institutions. However, using a user ID and any other authentication information for a transaction via a network terminal, as described above, has not been standardized among different financial institutions.

Therefore, it is necessary to develop different authentication systems for a transaction using an ATM and a transaction via a network even for the same account. Furthermore, a user who has accounts at a plurality of financial institutions needs to memorize a personal identification number corresponding to each card for each of the accounts. In addition, the user also needs to memorize additional authentication information, such as a user ID and/or a password, for each of the plurality financial institution to perform via a network terminal a transaction related to each of the same accounts.

Recently, a technique has been implemented for storing/writing a card number or the like in a contactless IC chip that is incorporated into a cellular phone and reading the card number by using a reading terminal device such as an ATM. A plurality of pieces of financial card information may be stored into a contactless IC chip (cf. e.g. Japanese Unexamined Patent Application Publication No. 7-334590). For example, cash card information, loan card information, and credit card information of each financial institution may be recorded as financial card information. It is possible to store and manage a plurality of pieces of financial card information in a single contactless IC chip. It is also necessary to ensure safe management of each of the plurality of pieces of financial card information by setting an individual encryption key for each of the plurality of pieces of financial card information.

If a contactless IC chip is incorporated into a cellular phone that functions as a network terminal, it is possible to store card information in the contactless IC chip and conduct a transaction via a network based on the written card information. If the card information that is stored in the contactless IC chip is encrypted by an individual encryption key for each piece of card information and a transaction can be conducted on a network using the encrypted card information, an inconvenience that a user needs to memorize a user ID and/or a password that is different for each financial institution can be eliminated.

However, encrypting the card information for storage in the contactless IC chip using an individual encryption key, requires the building of an authentication system that issues an encryption key for encrypting card information and authenticates a card by decrypting the encrypted card information in each financial institution that issues a card. Furthermore, a long processing time for authentication since authentication of a pieces of financial card information that is written to the contactless IC chip is performed in each financial institution.

In light of the foregoing, there is a need for an improved communication device, a remote server, a terminal device, a financial card issue system, a financial card authentication system and a program that allow the authentication of card information via a network terminal without using a user ID and/or a password required for exclusive use in a transaction via a network terminal and without building a separate authentication system at each financial institution.

SUMMARY

Embodiments consistent with the present disclosure relate to a communication device, a remote server, a terminal device, a financial card issue system, a financial card authentication system, and a computer-readable storage medium for authenticating card information via a network terminal.

In one exemplary embodiment, a communication device incorporating an IC chip is provided. The communication device may be connected to a financial institution server and a remote server through a network. The communication device may include, for example, a card issue request portion for requesting the financial institution server to issue a first card; a card information write request portion for receiving first card information corresponding to the first card from the financial institution server and requesting the remote server to write the first card information; and a storage portion including a first individual area, a second individual area, and a common area. The first individual area may store the first card information and the second individual area stores second card information of a second card issued by the financial institution server. A unique individual encryption key, unique to the first card information, may be required to access the first card information in the first individual area. The common area may store an individual area identification number for identifying the first individual area and the individual encryption key, and the common area is accessible by using a common encryption key recorded in the remote server.

In one alternate embodiment, the remote server may write the encrypted first card information into the first individual area and may write the individual area identification number and the individual encryption key into the common area. The common area may be created by the remote server before a creation of the first individual area, and a third individual area may be created by the remote server for third card information when a request from the card information write request portion is made. The common area may store individual area search information for searching for the first individual area, and the individual area search information may be a financial institution type in association with a card name. The remote server may encrypt the first card information and affix a digital signature in response to a request from the card information write request portion. The IC chip may be capable of contact communication or contactless communication. The storage portion may be the IC chip.

In another exemplary embodiment, a communication device incorporating an IC chip is provided including, for example a storage portion including a first individual area, a second individual area, a card information authentication request portion for requesting a remote server to authenticate a first card information by decrypting the first individual area; a card information reception portion for receiving the first card information from the remote server; a personal identification number input portion for accepting input of a personal identification number corresponding to the first card information; a card information transmission portion for transmitting the first card information and the personal identification number to the financial institution server; and an authentication result reception portion for receiving an authentication result of authenticating the first card information and the personal identification number from the financial institution server.

In one alternate embodiment, the remote server may acquire the individual area identification number and the individual encryption key and may decrypt the first individual area by using the acquired individual encryption key. The remote server may transmit the first card information to the communication device when the first individual area is properly decrypted using the individual encryption key. The financial institution server may authenticate whether the first card information and the personal identification number transmitted from the communication device are in a proper combination.

In another exemplary embodiment, a remote server may be provided. The remote server may be connected to a communication device and a financial institution server through a network. The remote server may include, for example: a storage portion for recording a common encryption key used to access the common area, wherein the common area stores an individual area identification number for identifying the first individual area and an individual encryption key for accessing the first individual area; an encryption portion for encrypting the first card information in response to a request for writing the first card information from the communication device; an individual area write portion for writing the first card information encrypted by the encryption portion into the first individual area; and a common area write portion for writing the individual area identification number and the individual encryption key into the common area.

In one alternate embodiment, the remote server may also include a common area creation portion for creating the common area when the common area does not exist in the IC chip.

In another exemplary embodiment, a remote server is provided including, for example: a storage portion for recording a common encryption key used to access a common area, wherein the common area records an individual area identification number for identifying a first individual area and an individual encryption key for accessing the first individual area; an area read portion for reading the common area and the first individual area in response to a request from a communication device to authenticate a first card information; a card information acquisition portion for acquiring the individual encryption key by decrypting the common area by using the common encryption key and acquiring the first card information by decrypting the first individual area by using the individual encryption key; and a card information transmission portion for transmitting the first card information to the communication device.

In another exemplary embodiment, a terminal device is provided including, for example: a card issue request portion for requesting the financial institution server to issue a first card in response to user input; and a card information write request portion for receiving first card information of the card from the financial institution server and requesting the remote server to write the first card information. The remote server may write the encrypted first card information into the first individual area, and the remote server writes an individual area identification number for identifying the first individual area and an individual encryption key used to encrypt the first individual area into the common area through the reader/writer.

In another exemplary embodiment, a terminal device capable of contactless communication with a communication device incorporating a contactless IC chip through a reader/writer, is provided including, for example: a card information authentication request portion for requesting the remote server to authenticate the first card information by decrypting the first individual area; a card information reception portion for receiving the first card information of the individual area decrypted using the common encryption key by the remote server; a personal identification number input portion for accepting input of a personal identification number corresponding to the first card information; a card information transmission portion for transmitting the first card information and the personal identification number to the financial institution server; and an authentication result reception portion for receiving an authentication result of the first card information and the personal identification number from the financial institution server.

In another exemplary embodiment, a financial card issue system is provided including, for example: a communication device comprising an IC chip, a financial institution server, and a remote server connected through a network. The financial institution server may include a card information transmission portion for transmitting first card information of a first card, to be issued in response to a first card issue request from the communication device, to the communication device. The communication device may include: a card issue request portion for requesting the financial institution server to issue the first card; a card information write request portion for receiving the first card information from the financial institution server and transmitting a card information write request to the remote server to write the first card information; and a storage portion comprising a first individual area, a second individual area, and a common area. The remote server may include a second storage portion for recording the common encryption key; an encryption portion for encrypting the first card information transmitted from the communication device in response to the card information write request; an individual area write portion for writing the first card information encrypted by the encryption portion into the individual area; and a common area write portion for writing the individual area identification number and the individual encryption key into the common area.

In another exemplary embodiment, a financial card issue system is provided including, for example: a communication device comprising an IC chip, a financial institution server, and a remote server connected through a network. The communication device may include: a storage portion comprising a first individual area, a second individual area, and a common area, a first individual area stores first card information and the second individual area stores second card information of a second card issued by the financial institution server, a common area that stores an individual area identification number for identifying the first individual area and a unique individual encryption key required to access the first card information stored in the first individual area, and the common area is accessible by using a common encryption key recorded in the remote server; a card information authentication request portion for transmitting a card authentication request to the remote server to authenticate the first card information by decrypting the first individual area; a card information reception portion for receiving the first card information decrypted by the remote server; a personal identification number input portion for accepting input of a personal identification number corresponding to the first card information; a card information transmission portion for transmitting the first card information and the personal identification number to the financial institution server; and an authentication result reception portion for receiving an authentication result of the first card information and the personal identification number from the financial institution server. The remote server may include, for example, a second storage portion for recording the common encryption key; an area read portion for reading the common area and the first individual area in response to the card authentication request; a card information acquisition portion for acquiring the individual encryption key by decrypting the common area by using the common encryption key and acquiring the first card information contained in the first individual area by decrypting the first individual area by using the individual encryption key; and a card information transmission portion for transmitting the card information to the communication device. The financial institution server may include, for example, a card information authentication portion for authenticating the first card information based on the card information and the personal identification number.

In an alternate embodiment, a financial institution server may include a card information transmission portion for transmitting first card information of a first card, to be issued in response to a first card issue request from the communication device, to the communication device.

In another alternate embodiment, the remote server may include a second storage portion for storing the common encryption key; an encryption portion for encrypting the first card information in response to a card information write request from the terminal device; an individual area write portion for writing the first card information encrypted by the encryption portion into the first individual area via the reader/writer; and a common area write portion for writing the individual area identification number and the individual encryption key into the common area.

In another alternate embodiment, a terminal device may include a card information authentication request portion for transmitting a request to the remote server to authenticate the first card information by decrypting the first individual area; a card information reception portion for receiving the first card information decrypted by the remote server; a personal identification number input portion for accepting input of a personal identification number corresponding to the first card information; a card information transmission portion for transmitting the first card information and the personal identification number to the financial institution server; and an authentication result reception portion for receiving an authentication result of authenticating the card information and the personal identification number from the financial institution server.

In another alternate embodiment, a remote server a second storage portion for storing the common encryption key; an area read portion for reading the common area and the first individual area via the reader/writer in response to the request to authenticate from the terminal device; a card information acquisition portion for acquiring the individual encryption key by decrypting the common area using the common encryption key and acquiring the first card information by decrypting the first individual area using the encryption key; and a card information transmission portion for transmitting the first card information to the terminal device. A financial institution server may include a card information authentication portion for authenticating the first card information based on the first card information and the personal identification number transmitted from the terminal device.

In another exemplary embodiment, a computer-readable storage media storing a program for causing a computer to execute a method, the method is provided, the method including, for example: requesting a financial institution server to issue a first card; receiving first card information corresponding to the first card from the financial institution server; requesting a remote server to store the first card information; storing the card information in a first individual area of an IC chip incorporated into a communication device, wherein the first area is accessible by using an individual encryption key unique to the first individual area; and storing an individual area identification number for identifying the first individual area and the individual encryption key in a common area of the IC chip, wherein the common area is accessible by using a common encryption key recorded in a remote server.

In another exemplary embodiment, a computer-readable storage media storing a program for causing a computer to execute a method is provided, the method including, for example: storing first card information corresponding to a first card issued by a financial institution server in a first individual area of an IC chip incorporated into a communication device, wherein the first area is accessible by using an individual encryption key unique to the first individual area; storing an individual area identification number for identifying the first individual area and the individual encryption key in a common area of the IC chip, wherein the common area is accessible by using a common encryption key recorded in a remote server; requesting the remote server to authenticate the first card information by decrypting the first individual area; receiving the first card information stored in the first individual area decrypted by the remote server; accepting input of a personal identification number corresponding to the first card information; transmitting the first card information and the personal identification number to the financial institution server; and receiving an authentication result of the first card information and the personal identification number from the financial institution server.

In another exemplary embodiment, a computer-readable storage media storing a program for causing a computer to execute a method, the method including, for example: recording a common encryption key used to access a common area of an IC chip, wherein the IC chip is incorporated into a communication device; encrypting first card information, corresponding to a first card issued by a financial institution server, in response to a request for writing the card information from the communication device; writing the first card information into a first individual area of the IC chip; and writing an individual area identification number used for identifying the first individual area and a unique individual encryption key used to access the first individual area into the common area.

In another exemplary embodiment, a computer-readable storage media storing a program for causing a computer to execute a method, the method including, for example: recording a common encryption key used to access a common area of an IC chip, wherein the IC chip is incorporated into a communication device; reading the common area and a first individual area corresponding to first card information in response to a card request to authenticate the first card information from the communication device, wherein first individual area of the IC chip stores the first card information corresponding to a first card issued by a financial individual server, and the first individual area is accessible by using an encryption key unique to the first individual area; acquiring the encryption key of the first individual area by decrypting the common area by using the common encryption key; acquiring the first card information by decrypting the first individual area by using the encryption key; and transmitting the first card information to the communication device.

In another exemplary embodiment, a computer-readable storage media storing a program for causing a computer to execute a method, the method including, for example: requesting a financial institution server to issue a first card in response to user input; receiving first card information corresponding to the card from the financial institution server; and requesting a remote server to write the first card information, wherein the remote server stores the first card information in a first individual area of an IC chip.

In another exemplary embodiment, a computer-readable storage media storing a program for causing a computer to execute a method, the method including, for example: requesting a remote server to authenticate first card information by decrypting a first individual area in an IC chip, wherein the first individual area stores the first card information corresponding to a first card issued by a financial individual server, and the first individual area is accessible by using an encryption key unique to the first individual area, and wherein the IC chip is incorporated into a communication device; receiving the first card information decrypted using the common encryption key by the remote server; accepting input of a personal identification number corresponding to the first card information; transmitting the first card information and the personal identification number to the financial institution server; and receiving an authentication result of the first card information and the personal identification number from the financial institution server.

BRIEF DESCRIPTION OF THE DRAWINGS

The accompanying drawings, which are incorporated in and constitute a part of this specification, show certain aspects of implementations consistent with the present invention and, together with the description, serve to explain the invention. In the drawings:

FIG. 3 illustrates an exemplary table showing contents of a storage portion of an IC chip;

DETAILED DESCRIPTION

Figure 1:
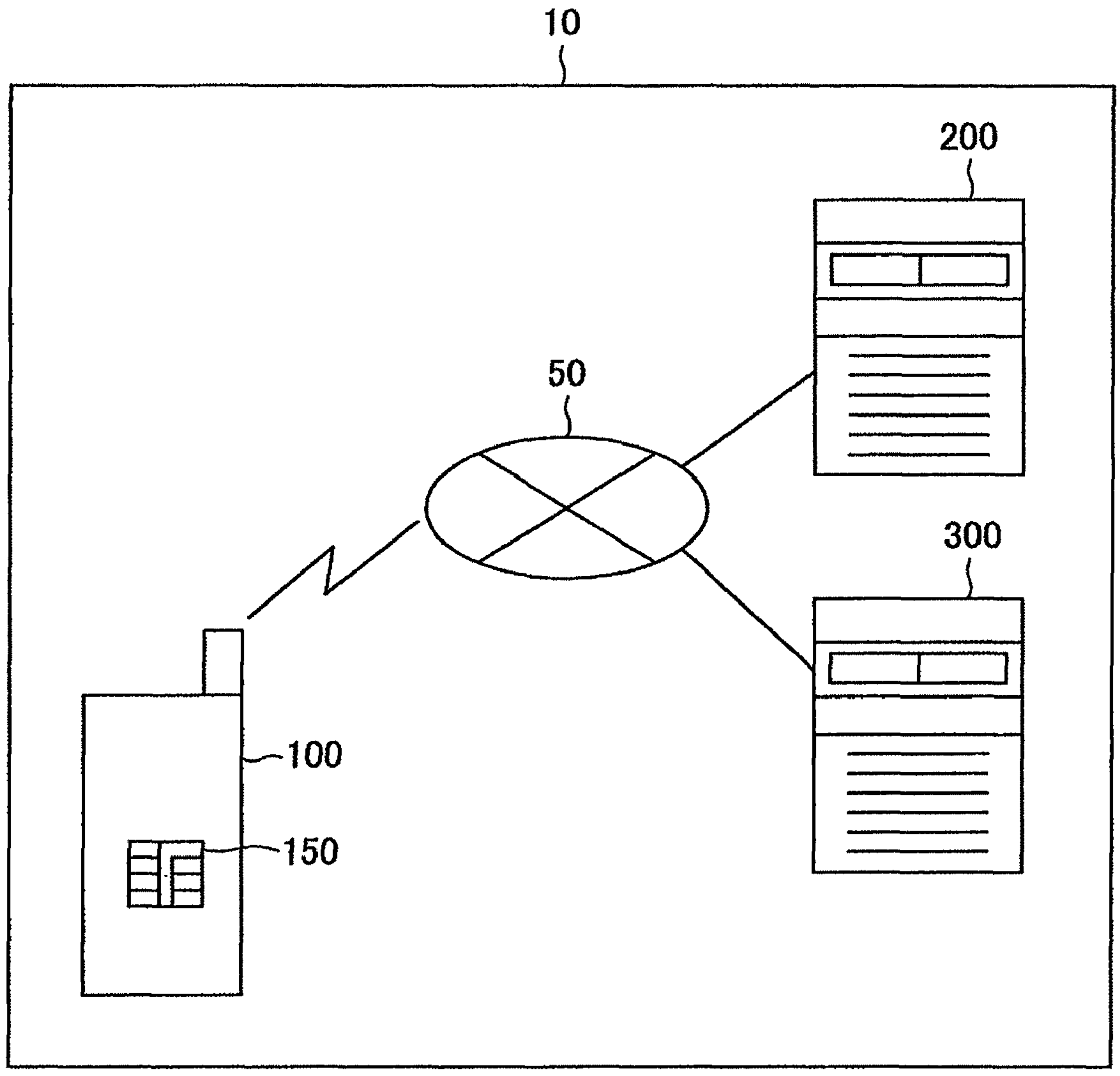
FIG. 1 illustrates an exemplary financial card issue/authentication system.

The following detailed description refers to the accompanying drawings. Wherever possible, the same reference numbers are used in the drawings and the following description to refer to the same or similar parts.

While several exemplary embodiments and features are described herein, modifications, adaptations and other implementations are possible, without departing from the spirit and scope of the description. For example, substitutions, additions or modifications may be made to the components (portions/areas) illustrated in the drawings, and the exemplary methods described herein may be modified by substituting, reordering or adding steps to the disclosed methods. Accordingly, the following detailed description is not intended to be limiting. Instead, the proper scope is defined by the appended claims.

A portion may refer to any physical component of a computer system. A portion may be one or more servers, one or more computers/computer systems, etc. A portion may include a processor. A portion may be an external device connected to a computer system or an internal device within a computer system.

FIG. 1 illustrates a configuration of an exemplary financial card issue/authentication system 10. Financial card issue/authentication system 10 may include a communication device 100, a remote server 200, a financial institution server 300, a network 50, etc.

Communication device 100, remote server 200, and financial institution server 300 may be connected via network 50. Network 50 may be a public line network, such as the Internet, a telephone line network, a satellite communication network, etc. Alternatively, network 50 may be a private line network, such as a WAN (Wide Area Network), a LAN (Local Area Network), an IP-VPN (Internet Protocol-Virtual Private Network), etc. Or, network 50 may be a combination of a public line network and a public line network. Network 50 may be a wired network or a wireless network.

Communication device 100 may be a portable terminal that incorporates an IC chip 150. A cellular phone that incorporates IC chip 150 is used merely as an example of communication device 100 in the following description. Other devices may be used as communication device 100. For example, communication device 100 may be a PDA (Personal Digital Assistants), a watch, a portable music player, or any other device that incorporates an IC chip and may connect to network 50.

IC chip 150 may be capable of contact communication or contactless communication. IC chip 150 may be secure memory that includes anti-tampering ability. IC chip 150 may also represent a plurality of IC chips included in communication device 100. Communication device 100 may use different IC chips for different uses. Communication device 100 incorporates IC chip 150 that is capable of providing financial services is used for illustration below.

Remote server 200 may be connected to communication device 100 via network 50. Remote server 200 may write and reads data to and from IC chip 150 according to a request from communication device 100. Remote server 200 may have an encryption key that encrypts data recorded in IC chip 150. Remote server 200 may write encrypted data into IC chip 150 or read encrypted data written into IC chip 150. Only remote server 200 that has the encryption key of IC chip 150 may be able to read data written IC chip 150. Thus, communication device 100 itself may not be able to decrypt and acquire the data written in IC chip 150. The data written in IC chip 150 may be card information of a financial institution. The card information may include one or more of the following: financial institution number, a branch code, an account number, an account type, etc.

Financial institution server 300 may be connected with communication device 100 via network 50. Financial institution server 300 may issue a card to be used for a transaction in a financial institution and may authenticate the card in response to a request from communication device 100. Specifically, financial institution server 300 may issue the card in response to a card issue request from communication device 100 and may transmit card information of the issued card to communication device 100.

A terminal of a financial institution, such as an ATM, may issue a card. It may take one or more days to one or more weeks for the actual card to be issued by a printing company and be mailed to a user. On the other hand, card information that is issued by financial institution server 300 may be written to IC chip 150 of communication device 100 by remote server 200 immediately, thereby significantly reducing a time necessary to issue the card.

The card information that is issued by financial institution server 300 may be encrypted by remote server 200 and recorded into IC chip 150 of communication device 100. Therefore, it may be possible to issue a card by writing card information into IC chip 150 without preparing a user ID or a password for exclusive use in a transaction via the network for a user. Furthermore, because remote server 200 may encrypt the card information and record it in IC chip 150 in a centralized manner, it is not necessary to build an issue system for encrypting card information and writing it into IC chip 150 in financial institution server 300.

As described above, only remote server 200 may be able to decrypt and acquire card information that is recorded in IC chip 150 of communication device 100. In response to a card authentication request from communication device 100, remote server 200 may transmit decrypted card information to communication device 100. Then, communication device 100 may transmit the received card information and a personal identification number corresponding to the card information to financial institution server 300. Then, financial institution server 300 may authenticate the card based on the card information and the personal identification number that are transmitted from communication device 100.

In this manner, remote server 200 may collectively decrypt card information, even if it is of different financial institutions or of different card types, and provide card information to communication device 100. Then, the card information that is provided to communication device 100 and a personal identification number corresponding to the card information that may be entered into communication device 100 may be transmitted to financial institution server 300. It is thus not necessary for each financial institution to build an authentication system for authenticating card information of its own, and it is possible to authenticate card information safely via the network without a user ID or a password for exclusive use in a transaction via the network.

The detailed configurations of communication device 100, IC chip 150, remote server 200, and financial institution server 300 of the financial card issue/authentication system 10 in relation to the issuance of a financial card are described below. In the following description, the system related to the issue of a financial card in financial card issue/authentication system 10 is referred to as financial card issue system 10, and the system related to authentication of a financial card in financial card issue/authentication system 10 is referred to as the financial card authentication system 10.

Figure 2:
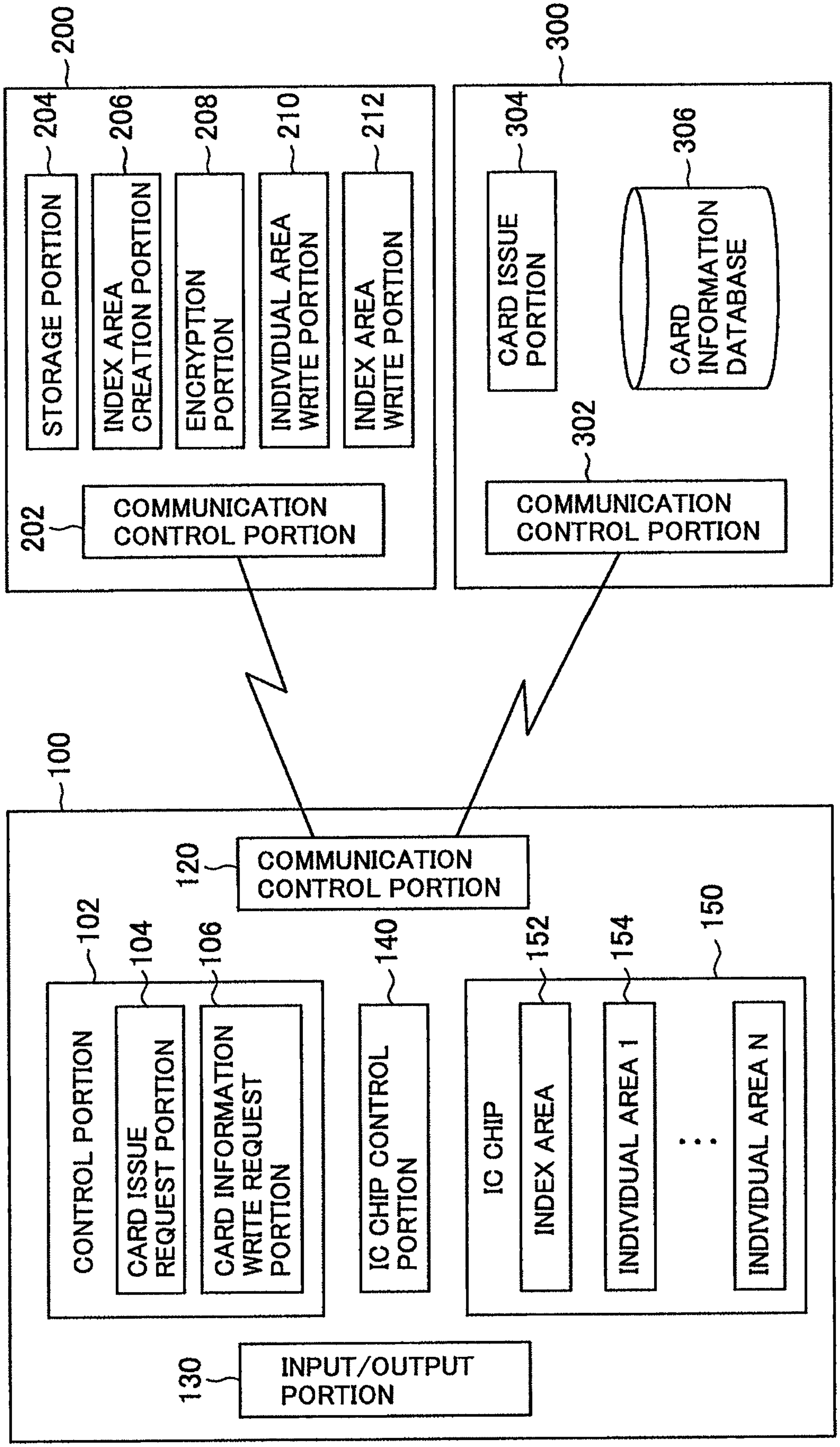
FIG. 2 is a block diagram illustrating an exemplary functional configuration of a communication device, an IC chip, a remote server, and a financial institution server in the financial card issue/authentication system illustrated in FIG. 1.

FIG. 2 is a block diagram illustrating an exemplary functional configuration of communication device 100, IC chip 150, remote server 200, and financial institution server 300 in the financial card issue/authentication system 10. Communication device 100 may include a control portion 102, a communication control portion 120, an input/output portion 130, an IC chip control portion 140, an IC chip 150, etc.

Control portion 102 may control the function of communication device 100 using a program executed within communication device 100. Control portion 102 may include a card issue request portion 104, a card information write request portion 106, etc. Card issue request portion 104 may request financial institution server 300 to issue a card via communication control portion 120. The card issue request may be made in response to input by a user. Specifically, the card issue request may be made by key input or the like by a user via input/output portion 130, which is described in further detail below.

Card information write request portion 106 may have a function to receive card information of a card that is issued by financial institution server 300 in response to a request from card issue request portion 104 via communication control portion 120 and request the remote server 200 to write the received card information into IC chip 150.

Communication control portion 120 may be a communication interface that is configured by a communication device or the like for connection with a network such as the Internet. Communication control portion 120 may exchange data with remote server 200 or financial institution server 300 via the network.

Input/output portion 130 may be composed of input and output interfaces that are included in communication device 100. The input interface may be, for example, a ten-key pad, buttons, or a touch panel that is configured to receive input entered by a user. The output interface may be, for example, a display device, such as a display screen, a lamp, or an audio output device such as a loudspeaker.

IC chip control portion 140 may exchange data between IC chip 150 and control portion 102 or the communication control portion 120 of communication device 100. IC chip 150 may be secure memory with an anti-tampering ability that is incorporated into communication device 100. IC chip 150 may perform contact communication or contactless communication with an external device. IC chip 150 may include a CPU (Central Processing Unit), ROM (Read Only Memory), RAM (Random Access Memory), a storage portion, etc. In one embodiment, IC chip 150 may include a storage portion and an index area 152. Storage portion 154 may include an individual area 154.

Index area 152 is an example of a common area which may be accessed using a common encryption key held by remote server 200. In index area 152, an individual area identification number for identifying the individual area 154 and an individual encryption key for each individual area 154 may be recorded. Individual area 154 is an area in which card information of each card that is issued by financial institution server 300 may be recorded and which may be accessed using a unique individual encryption key that is set for each card information. IC chip 150 may include a plurality of individual areas.

The details of index area 152 and individual area 154 are described hereinafter with reference to FIGS. 3 and 4. FIG. 3 illustrates an exemplary table showing contents of a storage portion of IC chip 150. Storage portion of IC chip 150 may store one or more of an area code that is area identification information for identifying each area, an area name 1504 that is the name of each area, a data name 1506 that is the name of data stored in each area, a service code 1508 of each area, stored data 1510, etc. FIG. 3 shows examples of card information 1 and card information 2 that may be stored individual area 154.

In stored data 1510 of index area 152, the area code "1000" of the card information 1, the area code "3000" of the card information 2, the key value 1 of the encryption key of the card information 1, and the key value 2 of the encryption key of the card information 2 are stored. In stored data 1510 for the card information 1, the card number "111-1111111" and the name "YAMADA" are stored. In stored data 1510 for the card information 2, the card number "222-2222222" and the name "YAMADA" are stored. Service code 1508 may be calculated based on the area code value of area code 1502. Stored data 1510 that is stored in index area 152 may be encrypted using an index area encryption key and affixed with an index area signature key. The encryption key and the signature key of index area 152 may be stored in the storage portion of remote server 200. Stored data 1510 that is stored for card information 1 may be encrypted by the encryption key 1, and stored data 1510 that is stored for card information 2 may be encrypted by the encryption key 2. Remote server 200 may decrypt and verify the signature of the data in the index area 152 using the encryption key and the signature key of the index area 152 that are stored in the remote server 200, acquire the area code of individual area 154 and the encryption key of each individual area 154, and acquire the stored data that is stored in individual area 154.

Figure 4:
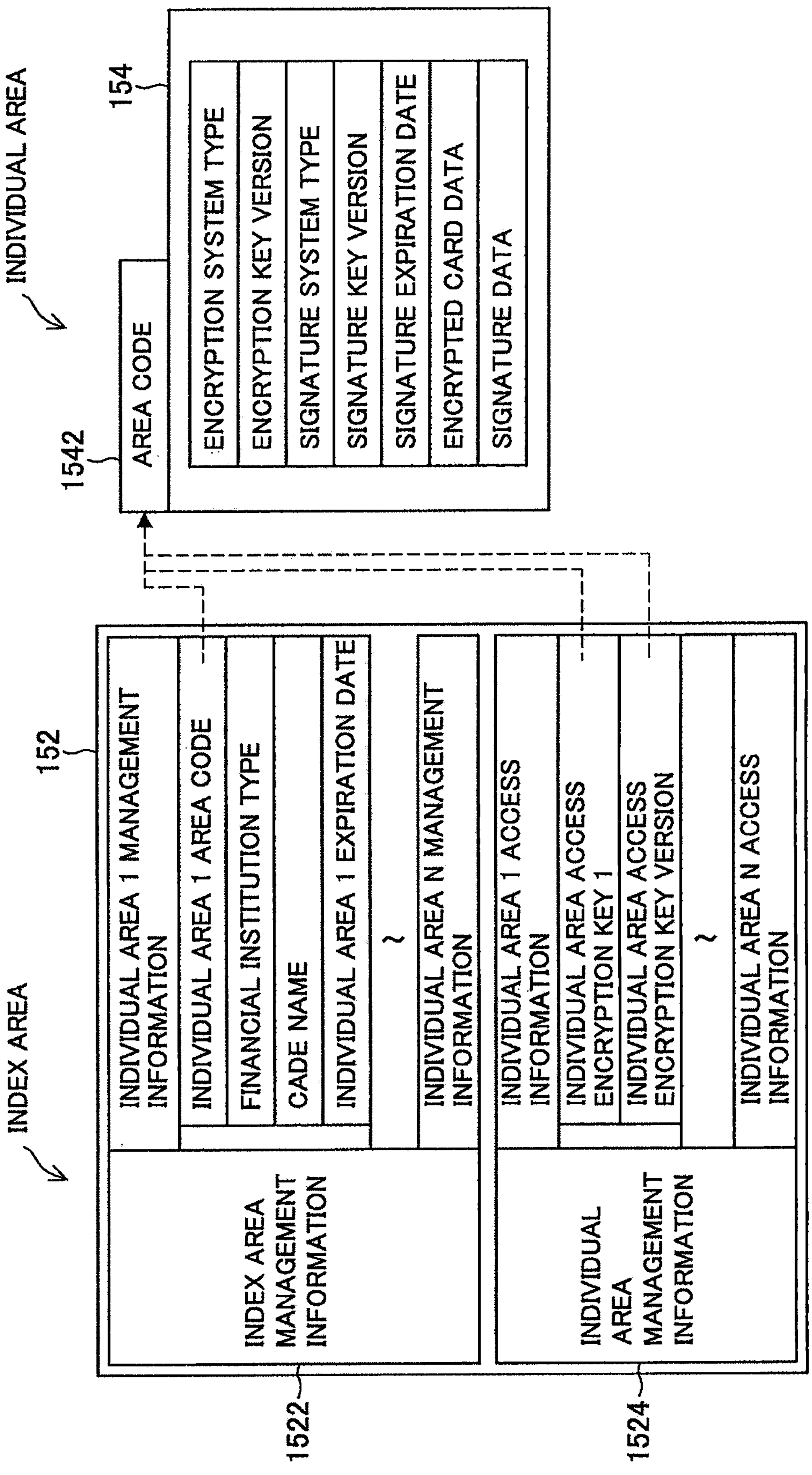
FIG. 4 illustrates an exemplary table showing contents of an index area and an individual area illustrated in FIG. 3.

FIG. 4 illustrates an exemplary table showing contents of index area 152 and individual area 154. Index area 152 may be composed of index management information 1522 and individual area management information 1524. Index management information 1522 may be information that manages the index of individual area 152, and it may include an area code that is individual area identification information for identifying the individual area, a financial institution type, a card name, an expiration date of the individual area, etc. Index management information 1522 may recorded as an individual area search information for searching for an individual area. Individual area management information 1524 may be information that manages an access method for each individual area, and it may include an individual area access encryption key, an individual area access encryption key version, etc. The same number of the individual area management information and the individual area access information as the number of individual areas 154 may be generated. Specifically, if an issue of a plurality of cards is requested, the same number of individual areas as the number of cards requested to be issued are created, and the same number of the individual area management information and the individual area access information are generated.

Individual area 154 may include an encryption system type, an encryption key version, a signature system type, a signature key version, a signature expiration date, encrypted card data, signature data, etc. in one individual area. Each individual area 154 may be identified by an area code 1542. As shown in FIG. 4, individual area 154 may be searched using the area code of the individual area that may be included in index management information 1522 of index area 152 and may be decrypted using the individual area access encryption key, the individual area access encryption key version, etc. that may be included in individual area management information 1524.

A functional configuration of remote server 200 illustrated in FIG. 2 is described herein below. Remote server 200 may include a communication control portion 202, a storage portion 204, an index area creation portion 206, an encryption portion 208, an individual area write portion 210, an index area write portion 212, etc. Communication control portion 202 may be a communication interface that may be configured by a communication device or the like for connection with a network such as the Internet, and it may exchange data with communication device 100 via the network.

Storage portion 204 may be nonvolatile memory such as EEPROM (Electrically Erasable Programmable Read-Only Memory) and EPROM (Erasable Programmable Read-Only Memory), magnetic disks such as a hard disk and a discoid magnetic disk, optical disks such as CD-R (Compact Disc Recordable)/RW (ReWritable), DVD-R (Digital Versatile Disk Recordable)/RW/+R/+RW/RAM (Random Access Memory), and BD (Blu-ray Disc (registered trademark))-R/BD-RE, or a storage medium such as MO (Magneto Optical) disk. In storage portion 204, a common encryption key for accessing the index area 152 of the communication device 100 may be recorded.

Index area creation portion 206 may create index area 152 in the IC chip 150 of communication device 100. Index area 152 may be created in advance before the writing of card information. Index area 152 may be created when writing of card information is requested from communication device 100, or it may be created in advance before writing of card information is requested from communication device 100.

Encryption portion 208 may encrypt the card information that is transmitted from communication device 100 in response to a request from communication device 100 for writing the card information of the card that is issued by financial institution server 300. Individual area write portion 210 may write the card information that is encrypted by the encryption portion 208 into individual area 154 of the IC chip 150 in communication device 100 via communication control portion 202.

Index area write portion 212 may write the individual area identification number of individual area 154 into which the card information is written by the individual area write portion 210 and the individual encryption key that is used to encrypt the individual area 154 into the index area 152 of IC chip 150 in communication device 100. If the card information written to the individual area 154 is affixed with a signature, the signature information may be written into the area 152 together with the individual encryption key.

Financial institution server 300 may include a communication control portion 302, a card issue portion 304, a card information database 306, etc. Communication control portion 302 may be a communication interface that is configured by a communication device or the like for connection with a network such as the Internet, and it may have a function to exchange data with communication device 100 via the network.

Card issue portion 304 may issue a card in response to a card issue request from communication device 100 and transmit card information of the issued card to communication device 100 via communication control portion 302. The card information may include a card number, a card holder name, a financial institution type, a card name, etc.

Card information database 306 may be nonvolatile memory such as EEPROM (Electrically Erasable Programmable Read-Only Memory) and EPROM (Erasable Programmable Read-Only Memory), magnetic disks such as a hard disk, and a discoid magnetic disk, optical disks such as CD-R (Compact Disc Recordable)/RW (ReWritable), DVD-R (Digital Versatile Disk Recordable)/RW/+R/+RW/RAM (Random Access Memory), and BD (Blu-ray Disc (registered trademark))-R/BD-RE, or a storage medium such as MO (Magneto Optical) disk. In card information database 306, card information of the card that is issued by the card issue portion 304 and a personal identification number that corresponds to the card information may be recorded.

Figure 5:
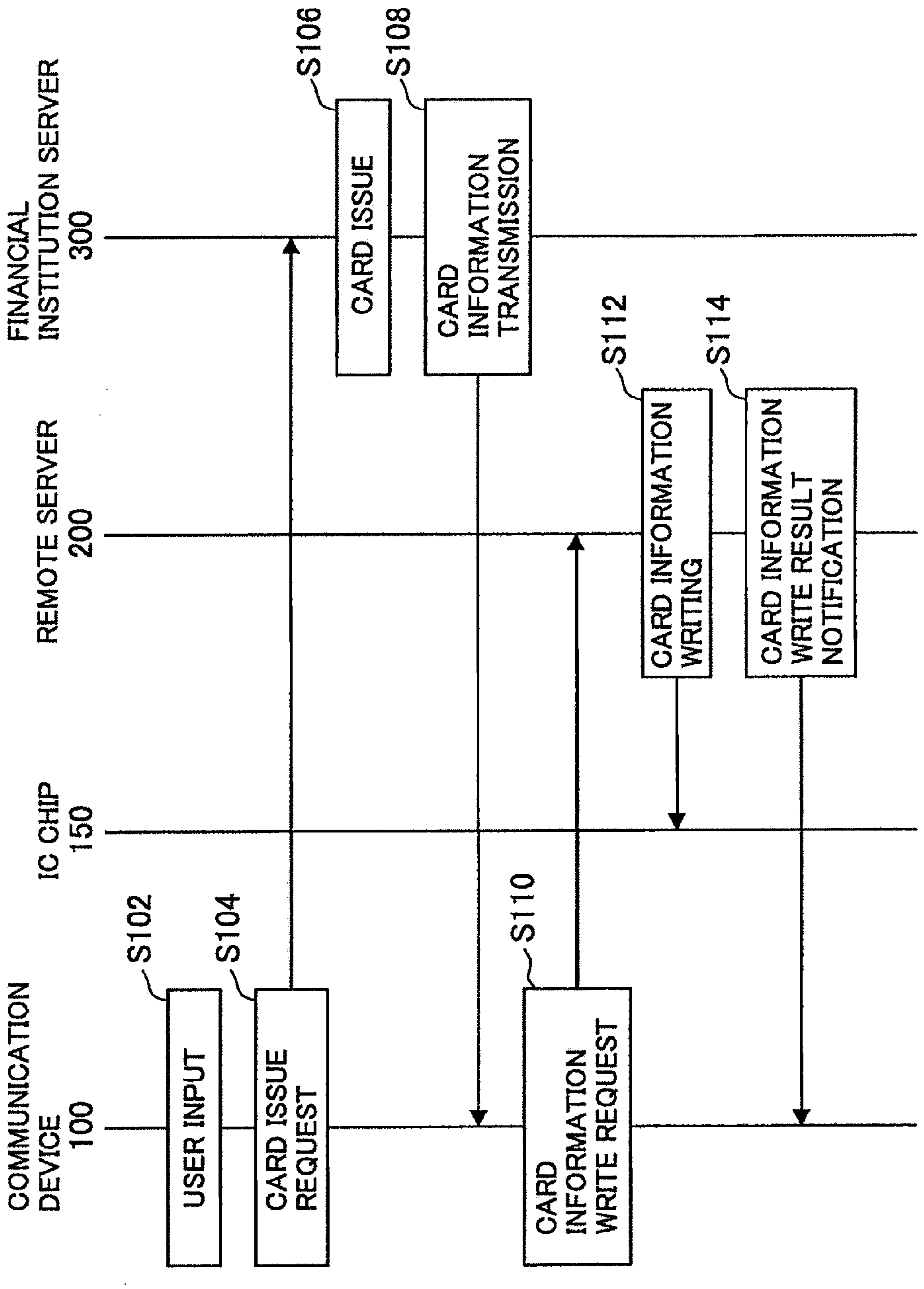
FIG. 5 illustrates a flowchart depicting an exemplary card issue method implemented in the financial card issue/authentication system illustrated in FIG. 1.

FIG. 5 illustrates a flowchart depicting an exemplary card issue method implemented in financial card issue/authentication system 10. First, user input may be made through input/output portion 130 of communication device 100 (S102). The user input in step S102 may activate a card issue request program of communication device 100 by key input or the like by a user. If the user input is made in step S102, card issue request portion 104 of communication device 100 may request financial institution server 300 to issue a card (S104). Financial institution server 300 that receives requests to issue a card from communication device 100 in step S104 may issue a card (S106).

Thereafter, financial institution server 300 may transmit card information of the card that is issued in the step S106 to communication device 100 (S108). Communication device 100 that receives the card information of the issued card transmitted in step S108 may request remote server 200 to write the card information (S110). Remote server 200 that is requested to write the card information in the step S110 may write the card information that is transmitted from communication device 100 into IC chip 150 (S112). Afterwards, remote server 200 may provide a result of writing the card information into IC chip 150 in step S112 to communication device 100 (S114). Communication device 100 that is notified of the writing result in step S114 may display the notified result on a display.

Figure 6:
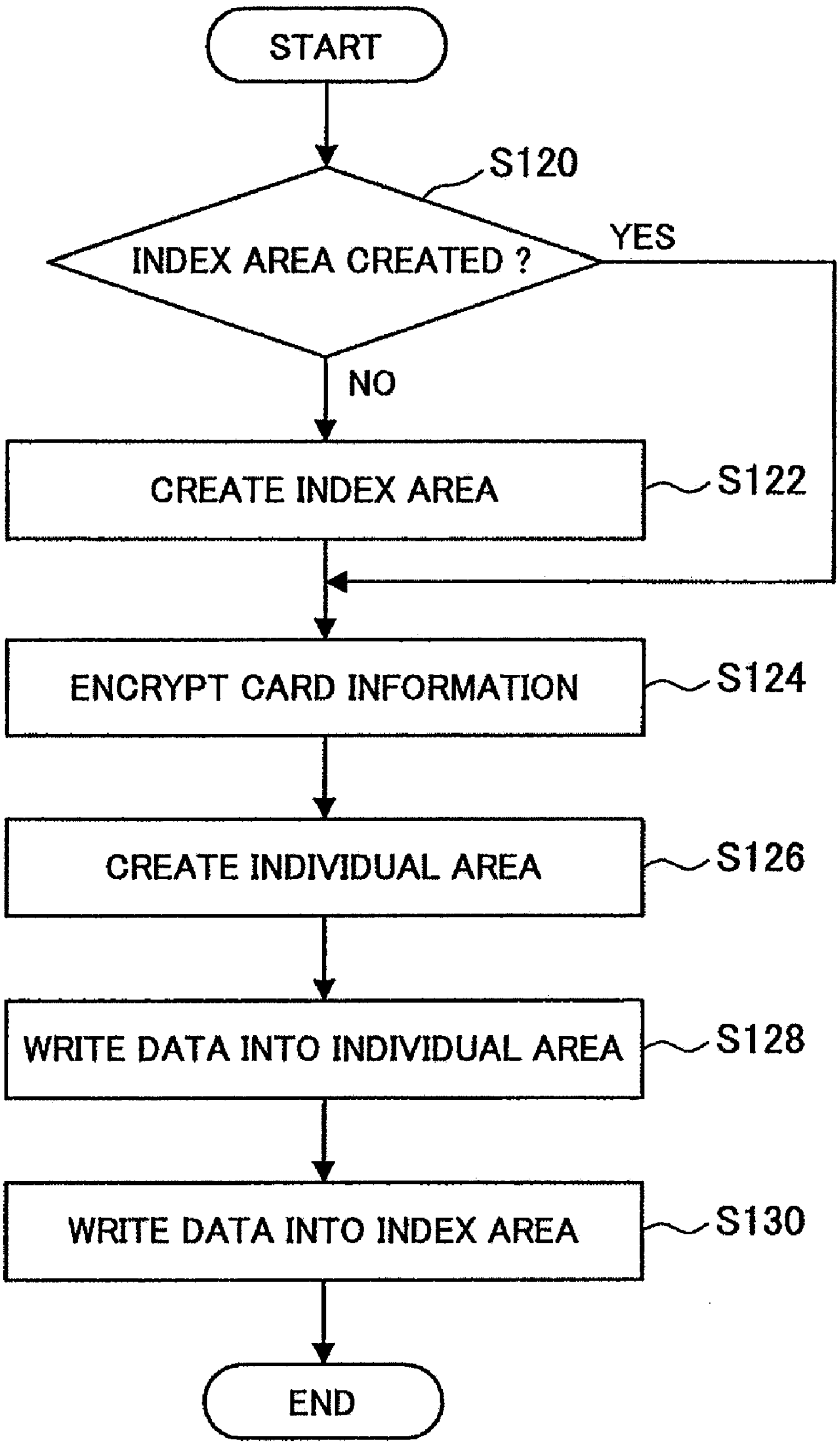
FIG. 6 illustrates a flowchart depicting storing card information in a remote server.

FIG. 6 illustrates a flowchart depicting storing card information in remote server 200. The storing may include writing the card information in remote server 200. Remote server 200 may first determine whether an index area is created in IC chip 150 (S120). If it is determined in step S120 that an index area is already created, the process may proceed to step S124. If, on the other hand, it is determined in step S120 that an index area is not yet created, an index area may be created in IC chip 150 (S122). The index area that is created in step S122 may be encrypted by a common encryption key that is recorded in storage portion 204 of remote server 200.

Next, the card information that is transmitted from communication device 100 may be encrypted (S124). In step S124, a digital signature may be affixed in addition to encrypting the card information. This may enhance the security of the card information in IC chip 150. Then, an individual area 152 may be created (S126). The individual area may be created in step S126 for each financial institution or for each card information of a financial institution.

Afterwards, the card information that is encrypted in step S124 may be written into the individual area that is created in step S126 (S128). Then, area identification information of the individual area into which the card information is written in step S128, an individual encryption key to access the individual area, and an encryption key version may be written into the index area (S130).

Financial institution server 300 may issue a card in response to a card issue request from communication device 100, and the remote server 200 may writes card information of the issued card into IC chip 150. The storage portion of IC chip 150 may include the index area and the individual area, and the encrypted card information may be written into the individual area, and the identification information and the individual encryption key of the individual area may be written into the index area. Thus, only remote server 200 may access or acquire the card information that is written into IC chip 150 of communication device 100, thereby enhancing the security of the card information written into IC chip 150.

Furthermore, because the financial institution only transmits the card information of the issued card to communication device 100, it is not necessary to build an encryption system for encrypting card information or a writing system for writing card information into IC chip 150. And because the card information is written into IC chip 150 of communication device 100, it is possible to save time and effort required to get a card issued by a printing company and mailed to a user, and it is not necessary for a user to have a plurality of cards for different financial institutions or different accounts, which is convenient.

Figure 7:
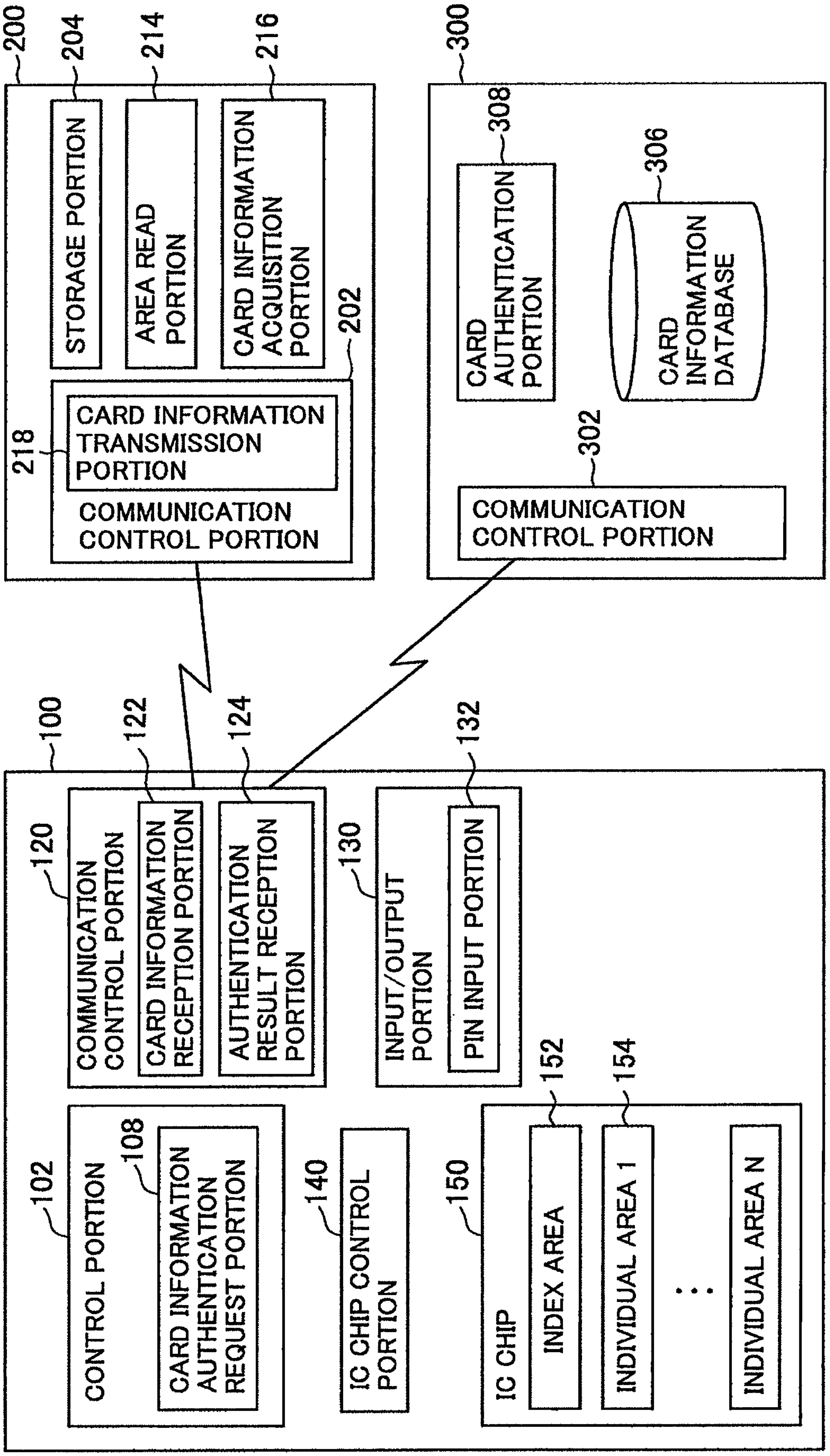
FIG. 7 is an alternative block diagram illustrating functional configuration of a communication device, an IC chip, a remote server, and a financial institution server in the financial card issue/authentication system illustrated in FIG. 1.

FIG. 7 is an alternative block diagram illustrating functional configuration of communication device 100, IC chip 150, remote server 200, and financial institution server 300 in the financial card issue/authentication system 10 illustrated in FIG. 1. Communication device 100 may include a control portion 102, a communication control portion 120, an input/output portion 130, an IC chip control portion 140, an IC chip 150, etc. IC chip control portion 140 and the IC chip 150 are the same as those described in FIG. 2.

Here, control portion 102 may control communication device 100 using a program within communication device 100. Communication device 100 may include a card information authentication request portion 108. Card information authentication request portion 108 may request remote server 200 to authenticate card information by decrypting an individual area that is recorded in IC chip 150. The request for card information authentication may be made in response to input by a user of communication device 100. For example, the request for card information authentication may be made by activating a financial transaction start program by a user via the input/output portion 130.

Communication control portion 120 is a communication interface that is configured by a communication device or the like for connection with a network such as the Internet, and it may exchange data with remote server 200 or financial institution server 300 via the network. Communication control portion 120 may include a card information reception portion 122, an authentication result reception portion 124, etc. Card information reception portion 122 may receive the card information of the individual area that is decrypted by remote server 200, and the authentication result reception portion 124 may receive an authentication result of the card information transmitted from remote server 200 and the personal identification number corresponding to the card information from the financial institution server 300. The personal identification number corresponding to the card information may be information input by a user of communication device 100.

Input/output portion 130 is composed of input and output interfaces that are included in communication device 100. Input/output portion 130 may include a personal identification number input portion 132. The personal identification number corresponding to the card information may be input by a user via personal identification number input portion 132. For example, the personal identification number may be input by a user through a ten-key pad or a touch panel placed on communication device 100.

Remote server 200 may include a communication control portion 202, a storage portion 204, an area read portion 214, a card information acquisition portion 216, etc. Storage portion 204 may have the same function as the one illustrated in FIG. 2, and a common encryption key for accessing the index area 152 of the communication device 100 may be recorded in storage portion 204.

Area read portion 214 may read index area 152 and individual area 154 corresponding to the card information requested to be authenticated by the communication device 100 in response to a request for authenticating the card information from the communication device 100. Communication device 100 may request authentication of the card information using the area number or the like of the individual area.

Card information acquisition portion 216 may decrypt index area 152 using the common encryption key that is recorded in storage portion 204 and may acquire the encryption key of individual area 154, and further decrypt the area 154 using the acquired encryption key and may acquire the card information that is contained in the individual area 154. Area code of individual area 154, the individual encryption key for accessing individual area 154, the version information of the individual encryption key and so on are recorded. The card information acquisition portion 216 that decrypts the index area 152 may acquire the individual encryption key of individual area 154 corresponding to area code designated by the communication device 100, version information of the individual encryption key and so on from index area 152. Then, card information acquisition portion 216 may decryps the individual area 154 using the acquired individual encryption key and so on and may acquire the card information such as a card number and a name.

Communication control portion 202 may be a communication interface that is configured by a communication device or the like for connection with a network such as the Internet. Communication control portion 202 may include a card information transmission portion 218 or the like. Card information transmission portion 218 may transmit the card information that is acquired by card information acquisition portion 216.

Communication control portion 302 and card information database 306 have the same functions as those described in reference to FIG. 2. Card authentication portion 308 may authenticate card information based on card information that is transmitted from communication device 100 and the personal identification number that is transmitted together with the card information. Card information database 306 may store the card information and the personal identification number.

Card authentication portion 308 may compare the card information and the personal identification number that are transmitted with the card information and the personal identification number that are recorded in the card information database 306 and authenticate whether the card information and the personal identification number are correct or not. The card information may be a card number, a card holder name, a financial institution type, a card name, etc. If the card information that is recorded in the individual area 154 is properly decrypted by remote server 200, the card information that is transmitted to financial institution server 300 matches the information that is recorded in card information database 306.

Figure 8:
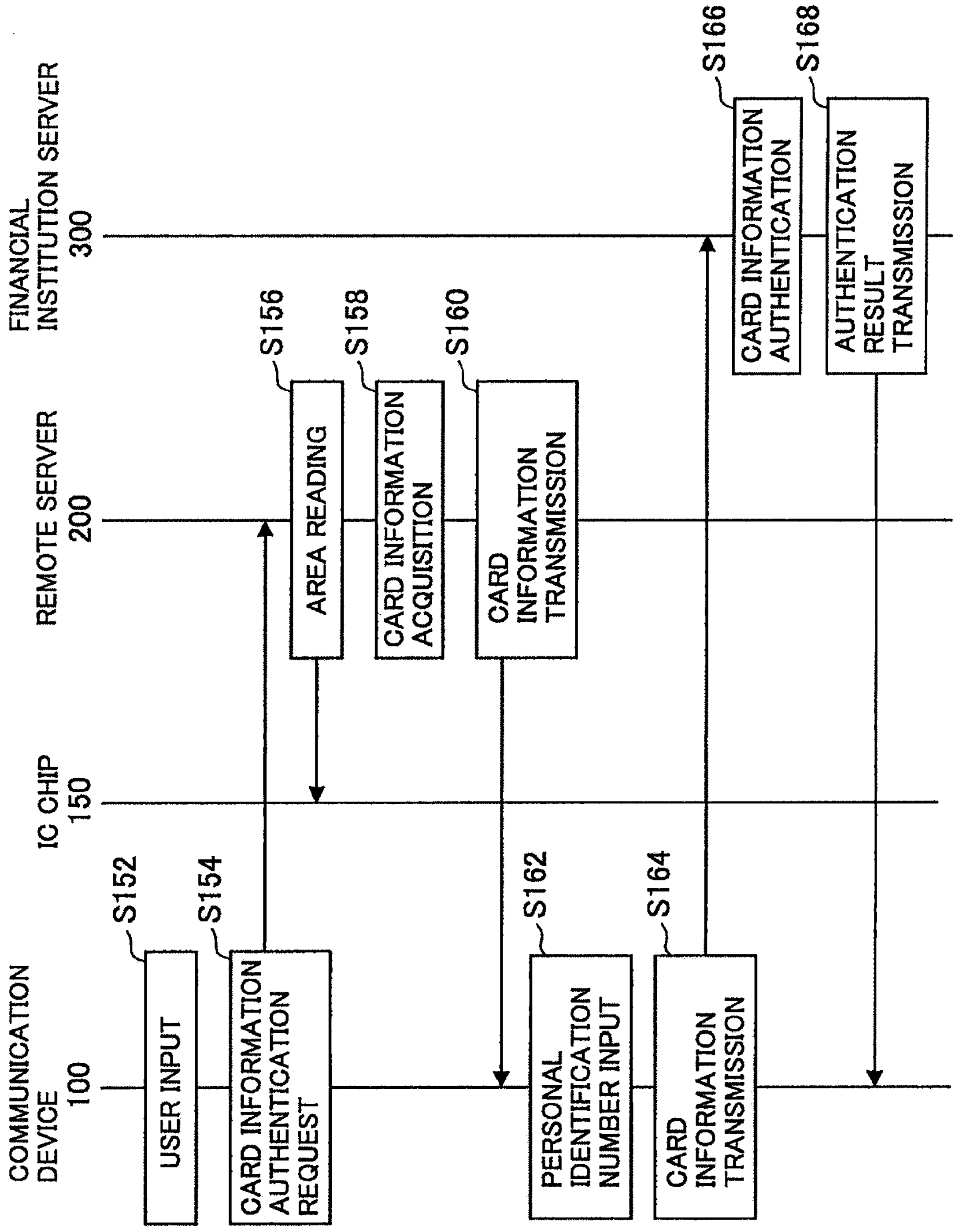
FIG. 8 illustrates a flowchart depicting a card authentication method implemented in the financial card issue/authentication system illustrated in FIG. 1.

FIG. 8 illustrates a flowchart depicting a card authentication method implemented in financial card issue/authentication system 10. The method is described with reference to components illustrated FIG. 7. First, a user makes a user input using input/output portion 130 of communication device 100 (S152). The user input in the step S152 may activate a card authentication request program of communication device 100 by key input. If the user input is made in step S152, card information authentication request portion 108 of communication device 100 may request remote server 200 to authenticate card information (S154).

Remote server 200 that is requested to authenticate the card information in the step S154 may read index area 152 and individual area 154 in the storage portion of IC chip 150 (S156). At this time, only individual area 154 whose authentication is requested from communication device 100 may be read. Then, the card information may be acquired from index area 152 and individual area 154 that are read in step S156 (S158). Afterwards, the card information that is acquired in step S158 may be transmitted to the communication device 100 (S160).

Communication device 100 that receives the card information transmitted from remote server 200 in step S160 may then accept input of a personal identification number corresponding to the card information (S162). In step 162, the transmitted card information may be displayed on a display of communication device 100, so that a personal identification number corresponding to the displayed card information may be input. Afterwards, the card information that is transmitted from remote server 200 in step S160 and the personal identification number that is input in step S162 are transmitted to financial institution server 300 (S164).

Financial institution server 300 that receives the card information and the personal identification number transmitted in step S164 may authenticate the card information (S166).

Financial institution server 300 that authenticates the card information in step S166 then may transmit a result of authenticating the card information to communication device 100 (S168). The authentication of the card information in step S166 may be performed based on whether the card information and the personal identification number that are transmitted match the card information and the personal identification number that are recorded in card information database 306. If the card information and the personal identification number match the information in card information database 306 in the step S166, financial institution server 300 may notify that the card information is properly authenticated in step S168, and, if not, in step S166, the financial institution server 300 may notify that the card information is not properly authenticated in the step S168.

Figure 9:
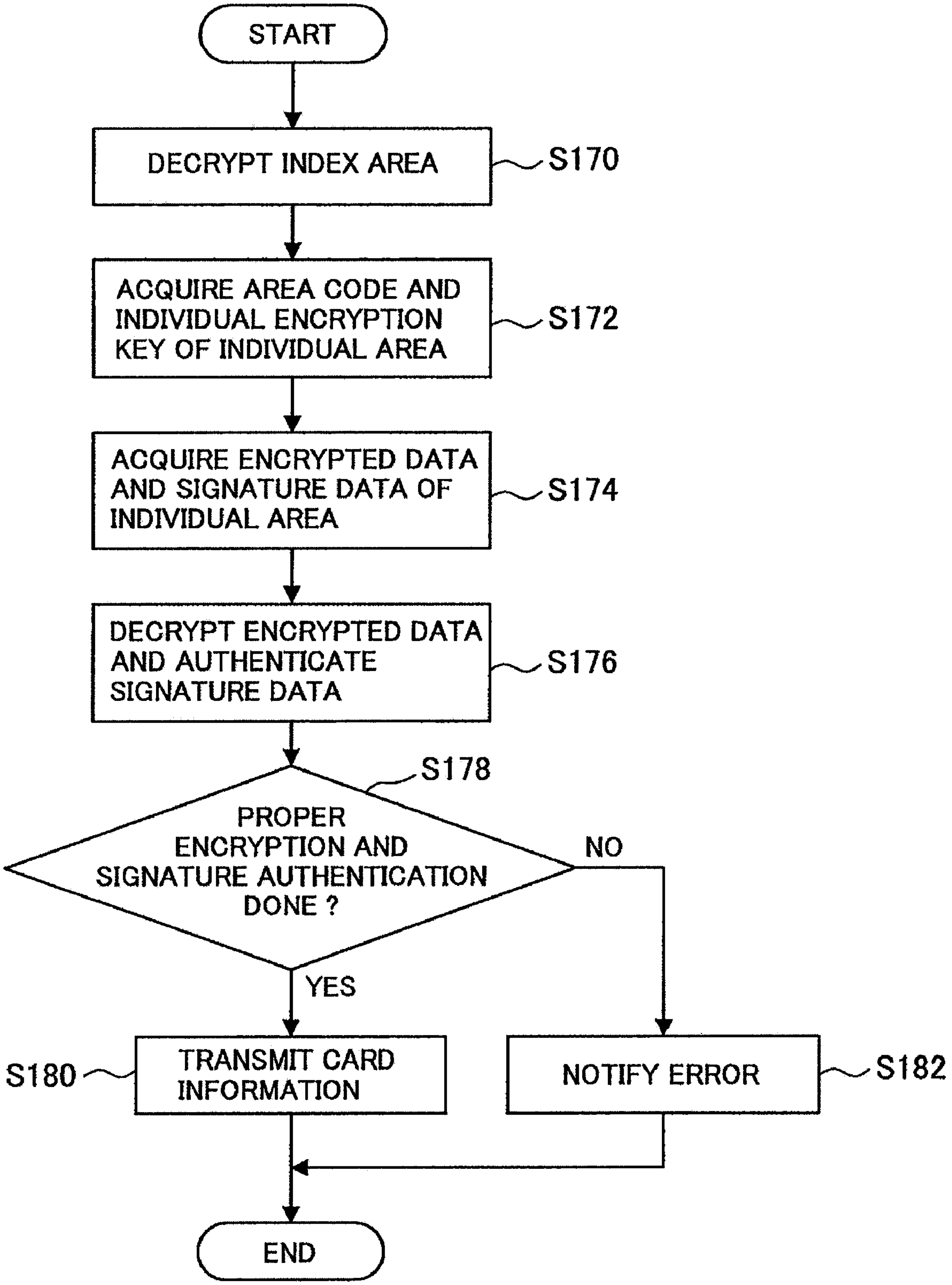
FIG. 9 illustrates a flowchart depicting acquiring card information in a remote server.

FIG. 9 illustrates a flowchart depicting acquiring card information in remote server 200. Remote server 200 that reads index area 152 and individual area 154 decrypts index area 152 using a common encryption key that is recorded in storage portion 204 (S170).

Next, area code and the individual encryption key of individual area 154 whose authentication is requested by communication device 100 may be acquired from index area 152 that is decrypted in step S170 (S172). Then, the encrypted data and the signature data that are recorded in individual area 154 may be acquired (S174).

The encrypted data that is acquired in step S174 may be decrypted by the individual encryption key that is acquired in step S172. Furthermore, the signature data that is acquired in step S174 is verified (S176). If encryption key version of the individual encryption key of individual area 154 is also recorded in index area 152, the encryption key version information may be used when decrypting individual area 154.

Then, it may be determined whether the encrypted data of individual area 154 is properly decrypted and the signature data is properly verified in step S176 (S178). If it is determined in step S178 that the proper decryption and signature verification are made, the card information is transmitted to communication device 100 (S180). If, on the other hand, it is determined in step S178 that the proper decryption and signature verification are not made, error notification indicating a failure in acquiring the card information is sent to communication device 100 (S182). The card information acquisition method in remote server 200 is described in the foregoing.

Remote server 200 may acquire card information from index area 152 and individual area 154 that are recorded in the storage portion of IC chip 150 in response to the card information authentication request from communication device 100. Then, the remote server 200 may transmit the acquired card information to communication device 100. Communication device 100 may transmit the received card information and the personal identification number that is input by a user to financial institution server 300.

Financial institution server 300 may authenticate the card information based on the transmitted card information and personal identification number. The card information that is written to IC chip 150 of communication device 100 may be acquired only by remote server 200 that has the common encryption key for decrypting index area 152, so that the security of the card information that is written to communication device 100 is high. Furthermore, because the card information that is written to the IC chip 150 is decrypted by remote server 200, it is not necessary for each financial institution to build a system for decrypting the encrypted card information. And because a user only needs to input the personal identification number corresponding to the card information, which is the personal identification number of a cash card, it is possible to conduct a transaction via the network in the same manner as a financial transaction using an ATM. It is therefore possible to conduct a financial transaction via the network without a user ID or a password for exclusive use in a transaction via the network.

Figure 10:
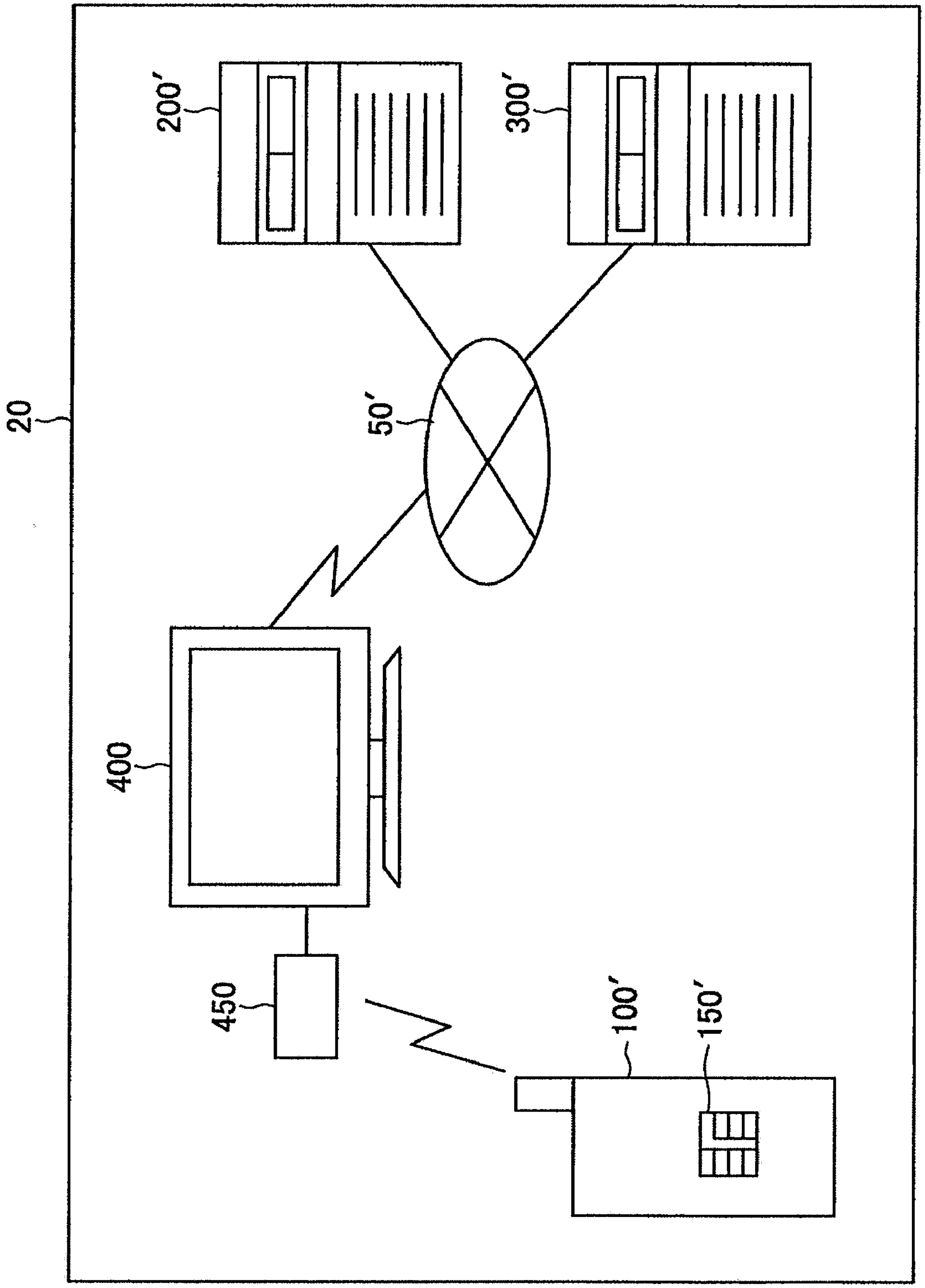
FIG. 10 illustrates another exemplary financial card issue/authentication system.

FIG. 10 illustrates an alternative exemplary financial card issue/authentication system 20. Financial card issue/authentication system 20 may include a communication device 100', a terminal device 400, a reader/writer 450, a remote server 200', a financial institution server 300', a network 50' etc.

Communication device 100' may be, for example, a cellular phone that incorporates a contactless IC chip 150'. Alternatively, the communication device 100' may be any communication device that incorporates a contactless IC chip 150', a PDA (Personal Digital Assistants), a watch, a portable music player, etc. Communication device 100' that incorporates the contactless IC chip 150' may contactlessly communicate with terminal device 400 via reader/writer 450 using a magnetic field of a specific frequency (e.g. 13.56 MHz).

Remote server 200' may be connected with terminal device 400 via network 50'. Remote server 200' may write and read data to and from contactless IC chip 150' in response to a request from terminal device 400. Specifically, remote server 200' has an encryption key that may encrypt data recorded in contactless IC chip 150' and write encrypted data into contactless IC chip 150. Only remote server 200' that has the encryption key of contactless IC chip 150' may read encrypted data written to the contactless IC chip 150'. Thus, the data written to contactless IC chip 150' is information that cannot be decrypted and acquired by communication device 100' or terminal device 400.

Terminal device 400 may contactlessly communicate with communication device 100' via reader/writer 450. In this embodiment, the terminal device 400 may be connected to the remote server 200' via network 50'. Communication device 100' does not have to incorporate a network connection function because terminal device 400 is connected to the remote server 200' via network 50'. Furthermore, communication device 100' does not have to incorporate an issue request program or an authentication request program because terminal device 400 makes a card information issue request and authentication request as well. Accordingly, communication device 100' of this embodiment only needs to incorporate contactless IC chip 150'. This may simplify and reduce the size of communication device 100'.

Financial institution server 300' and network 50' may be substantially similar to financial institution server 300 and network 50 illustrated in FIG. 2. Remote server 200' may encrypt the card information that is issued by financial institution server 300' and recorded into contactless IC chip 150' of communication device 100'. Therefore, it may be possible to issue a card by writing the card information into contactless IC chip 150' without preparing a user ID or a password for exclusive use in a transaction via the network for a user. Furthermore, because remote server 200' encrypts the card information and records it into contactless IC chip 150' in a centralized manner, it may not be necessary to build an issue system for encrypting card information and writing it into contactless IC chip 150' in financial institution server 300'.

Only remote server 200' may be able to decrypt and acquire card information that is recorded in contactless IC chip 150' of communication device 100'. In response to a card authentication request from terminal device 400, remote server 200' may transmit decrypted card information to terminal device 400. Then, terminal device 400 may transmit the received card information and a personal identification number corresponding to the card information to financial institution server 300'. Financial institution server 300' may authenticate a card based on the card information and the personal identification number that are transmitted from the terminal device 400.

In this manner, remote server 200' may collectively decrypt card information, even if it is of different financial institutions or of different card types, and notify it to terminal device 400. The card information that is notified to terminal device 400 and a personal identification number corresponding to the card information that is input to terminal device 400 are transmitted to financial institution server 300'. It is thus not necessary for each financial institution to build an authentication system for authenticating card information of its own, and it is possible to authenticate card information safely via the network without a user ID or a password for exclusive use in a transaction via the network.

In the following, the detailed configurations of the communication device 100', the contactless IC chip 150', the remote server 200', the financial institution server 300', the terminal device 400 and the reader/writer 450 of the financial card issue/authentication system 20 in relation to the issue of a financial card are described. In the following description, the system related to the issue of a financial card in the financial card issue/authentication system 20 is referred to as the financial card issue system 20, and the system related to the authentication of a financial card in the financial card issue/authentication system 20 is referred to as the financial card authentication system 20.

Figure 11:
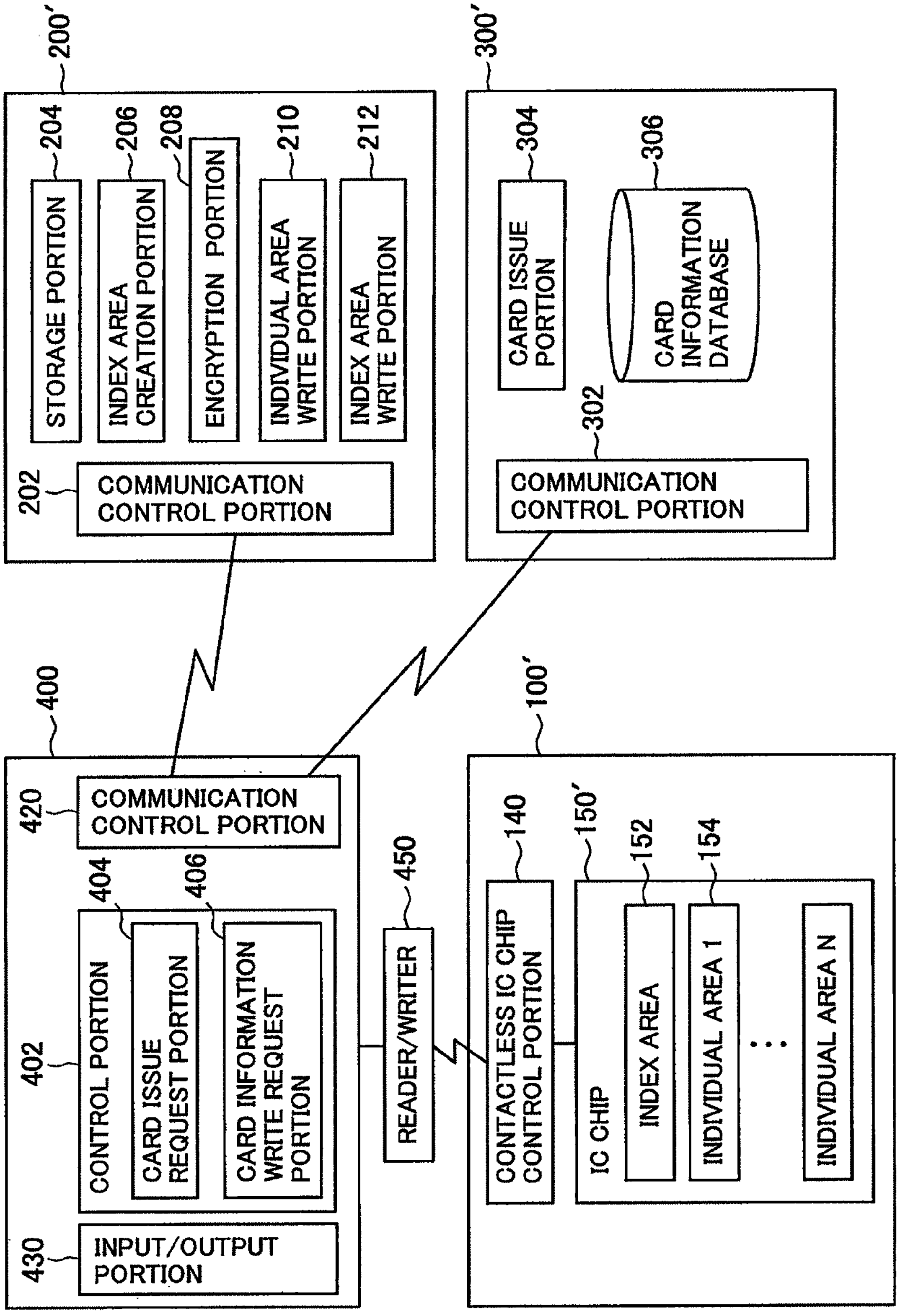
FIG. 11 is a block diagram illustrating an exemplary functional configuration of a communication device, a contactless IC chip, a remote server, a financial institution server, a terminal device, and a reader/writer in the exemplary financial card issue/authentication system illustrated in FIG. 10.

FIG. 11 is a block diagram illustrating an exemplary functional configuration of a communication device, a contactless IC chip, a remote server, a financial institution server, a terminal device, and a reader/writer in the exemplary financial card issue/authentication system illustrated in FIG. 10. Communication device 100' may includes a contactless IC chip control portion 140', the contactless IC chip 150', etc.

Contactless IC chip control portion 140' may exchange data between contactless IC chip 150' and reader/writer 450. Contactless IC chip 150' is incorporated into communication device 100' and has a function to contactlessly communicate with terminal device 400, which is an external device via reader/writer 450. Contactless IC chip 150' may include a CPU (Central Processing Unit), ROM (Read Only Memory), RAM (Random Access Memory), a storage portion, etc. In this embodiment, contactless IC chip 150' may include a storage portion and has an index area 152 and an individual area 154 in the storage portion.

Terminal device 400 may contactlessly communicate with communication device 100' that incorporates contactless IC chip 150' via reader/writer 450. Terminal device 400 may be a PC (personal computer) or a household electrical appliance such as a television or a recorder. Terminal device 400 may include an input/output unit such as a keyboard and a display. Terminal device 400 further may communicate with remote server 200' and financial institution server 300' via network 50'.

Terminal device 400 may includes a control portion 402, a communication control portion 420, an input/output portion 430, etc. Control portion 402 may include a card issue request portion 404, a card information write request portion 406, etc. Card issue request portion 404 may request financial institution server 300' to issue a card via communication control portion 420. The card issue request may be made in response to input by a user. Specifically, the card issue request may be made by key input or the like by a user via the input/output portion 430, which is described later.

Card information write request portion 406 may receive card information of a card that is issued by financial institution server 300' in response to a request from card issue request portion 404 via the communication control portion 420 and request remote server 200' to write the received card information. The writing of card information may include writing card information into the contactless IC chip 150'.

Communication control portion 420 is a communication interface that is configured by a communication device or the like for connection with a network such as the Internet. Communication control portion 420 may exchange data with remote server 200' or financial institution server 300' via network 50'.

Input/output portion 430 may be composed of input and output interfaces that are included in terminal device 400. The input interface may receive input entered by a user through, for example, a ten-key pad, buttons, a touch panel, etc. The output interface may be a display device such as a display, a lamp, an audio output device such as a loudspeaker, etc.

Reader/writer 450 may contactlessly communicate with contactless IC chip 150' through radio communication and transmit a data update request or the like from terminal device 400 to contactless IC chip 150'. Terminal device 400 and reader/writer 450 may be configured as an integrated unit or may be configured as separate units and be connected by a cable. Terminal device 400 may send a data update request or the like independently, or it may be connected to the remote server 200' or the financial institution server 300' via a network such as the Internet and make a data update request or the like in response to a request from the server device or the like.

In this embodiment, communication control portion 202 of remote server 200' may exchanges data with terminal device 400 via the network. Index area creation portion 206 may create index area 152 in contactless IC chip 150' of communication device 100'. Encryption portion 208 may encrypt the card information that is transmitted from terminal device 400 in response to a request for writing card information of a card that is issued by financial institution server 300' from terminal device 400.

Individual area write portion 210 writes the card information that is encrypted by encryption portion 208 into individual area 154 of contactless IC chip 150' in communication device 100' via the communication control portion 202. Index area write portion 212 may write the individual area identification number of individual area 154 and the individual encryption key into index area 152 of contactless IC chip 150'.

Financial institution server 300' may be substantially similar to financial institution server 300 of financial system 10. In this embodiment, communication control portion 302 may exchange data with terminal device 400 via the network. Card issue portion 304 may issues a card in response to a card issue request from terminal device 400 and transmits card information of the issued card to terminal device 400 via communication control portion 302. Card information database 306 may store card information of the card that is issued by card issue portion 304 and a personal identification number that corresponds to the card information.

Figure 12:
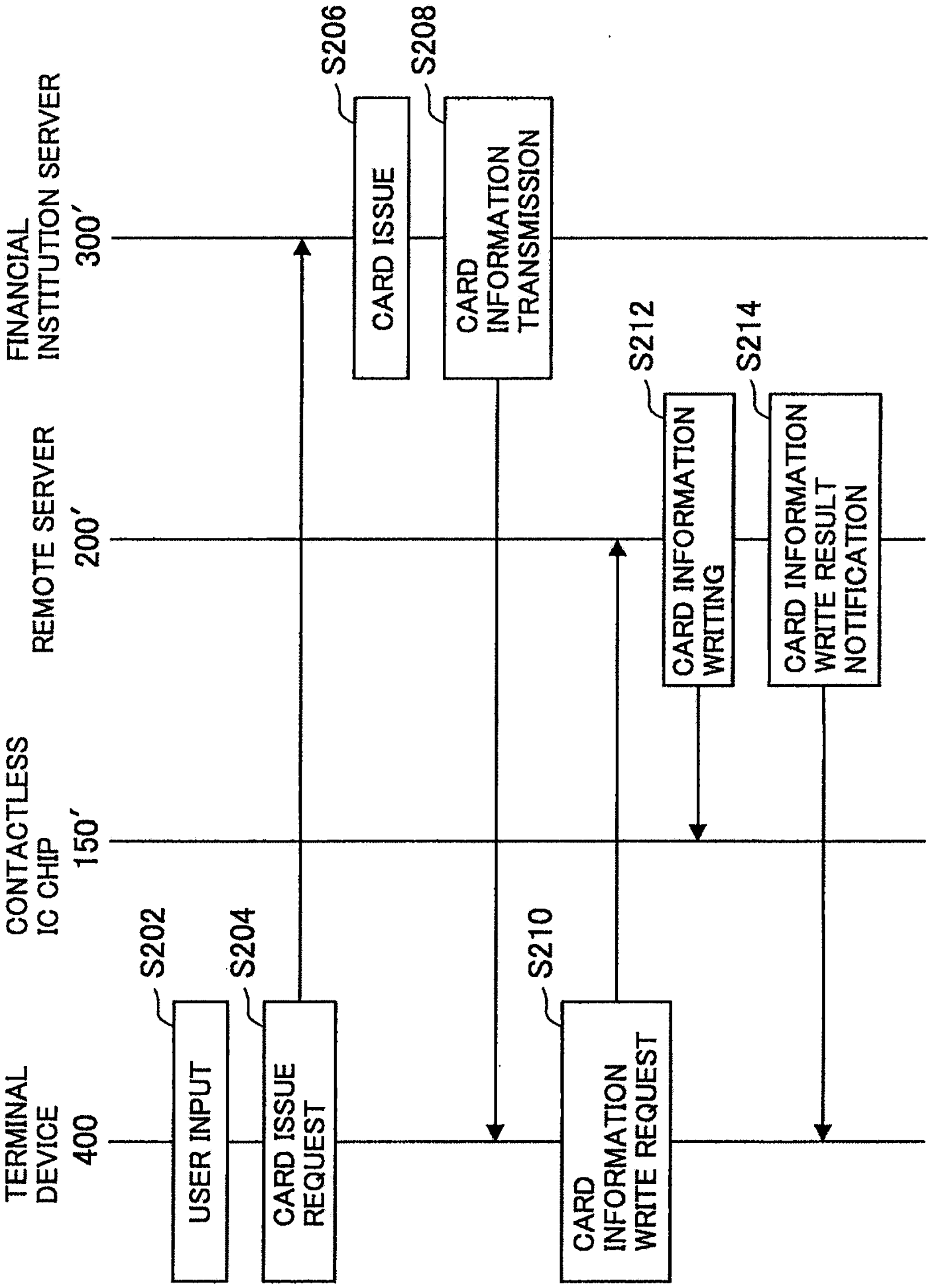
FIG. 12 illustrates a flowchart depicting a card issue method implemented in the financial card issue system illustrated in FIG. 10.

FIG. 12 illustrates a flowchart depicting a card issue method implemented in financial card issue system 20. First, a user input may be made through input/output portion 430 of terminal device 400 (S202). The user input in step S202 may activate a card issue request program of terminal device 400. If the user input is made in step S202, the card issue request portion 404 of the terminal device 400 may request the financial institution server 300' to issue a card (S204). The financial institution server 300' that is requested to issue a card by the terminal device 400 in the step S204 may issue a card (S206).

Then, financial institution server 300' may transmit card information of the card that is issued in step S206 to terminal device 400 (S208). Terminal device 400 that receives the card information of the issued card transmitted in the step S208 may request the remote server 200' to write the card information (S210). The remote server 200' that is requested to write the card information in the step S210 may write the card information that is transmitted from the terminal device 400 into contactless IC chip 150' of communication device 100' (S212). Afterwards, remote server 200' may notify a result of writing the card information into contactless IC chip 150' in step S212 to terminal device 400 (S214). Terminal device 400 that is notified of the writing result in step S214 may display the notified result on a display.

Financial institution server 300' may issues a card in response to a card issue request from terminal device 400, and remote server 200' may write card information of the issued card into contactless IC chip 150'. The storage portion of contactless IC chip 150' may include index area 152 and individual area 154, and the encrypted card information is written into individual area 154, and the identification information and the individual encryption key of the individual area are written into index area 152. Thus, the card information that is written into the contactless IC chip 150' of the communication device 100' can be accessed or acquired only by remote server 200'. This may enhance the security of card information written into the contactless IC chip 150'.

Furthermore, because the financial institution may only transmit the card information of the issued card to terminal device 400, it may not necessary to build an encryption system for encrypting card information or a writing system for writing card information into the contactless IC chip 150'. And because the card information is written to contactless IC chip 150' of communication device 100', it may be possible to save time and effort necessary for a printing company to issue a card and mail it to a user. And it may not be necessary for a user to have a plurality of cards for different financial institutions or different accounts.

Because terminal device 400 makes a card issue request and a card information write request, communication device 100' only needs to incorporate contactless IC chip 150'. This may allow to simplify communication device 100'. Furthermore, because terminal device 400 may be any device connectable to the network and including reader/writer 450 capable of contactless communication, it is not necessary to install device 400 in a financial institution or the like. Therefore, a PC or a household electrical appliance that is owned by a user may be used as terminal device 4000. In other words, it may not be necessary to use a device for exclusive use as terminal device 400.

Figure 13:
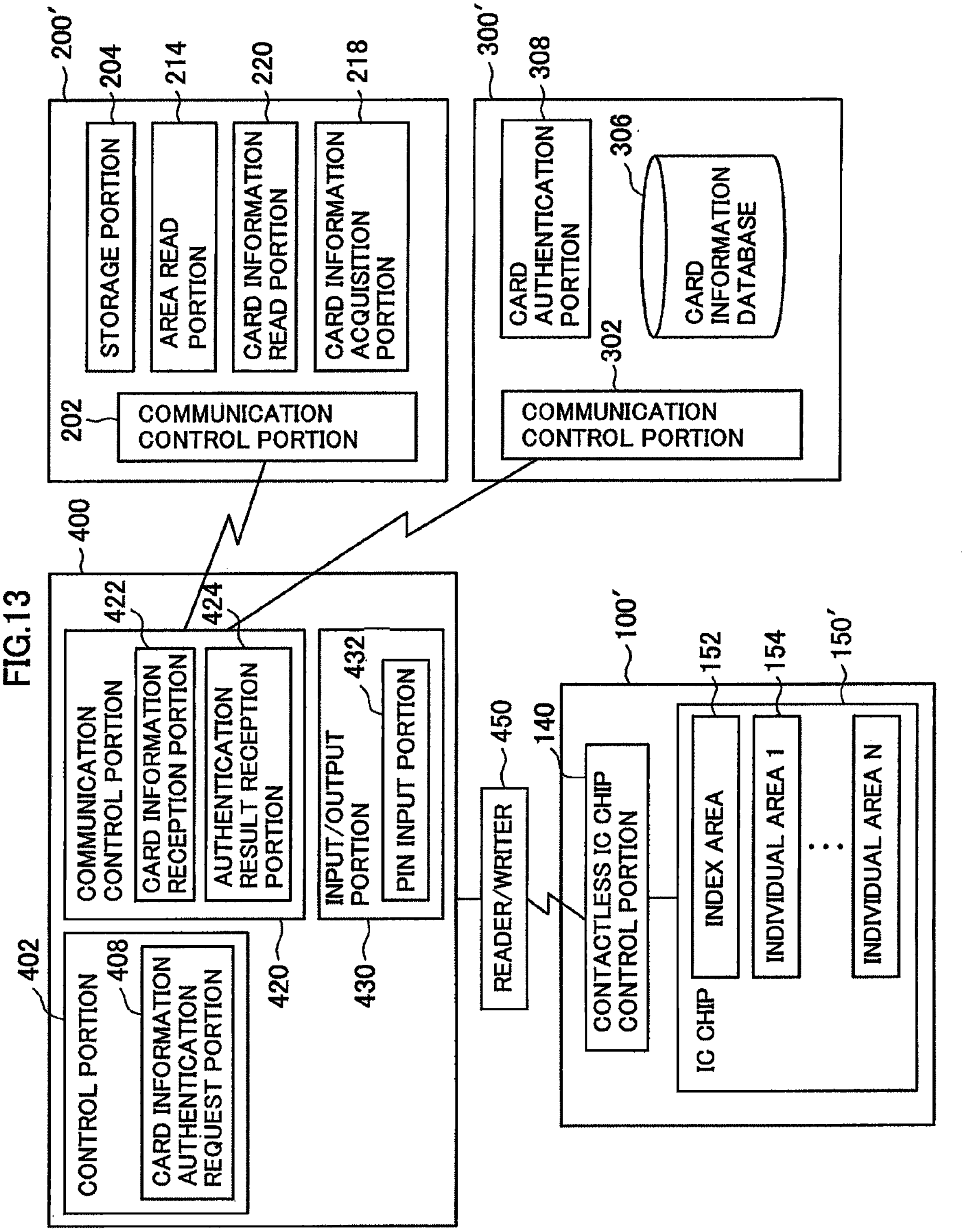
FIG. 13 is an alternative block diagram illustrating functional configuration of a communication device, a contactless IC chip, a remote server, a financial institution server, a terminal device, and a reader/writer in the financial card issue system illustrated in FIG. 10.

FIG. 13 is an alternative block diagram illustrating an functional configuration of communication device 100', contactless IC chip 150', remote server 200', financial institution server 300', terminal device 400 and reader/writer 450 of financial card issue system 20.

Terminal device 400 may include control portion 402, communication control portion 420, input/output portion 430, etc. Control portion 402 may include a card information authentication request portion 408. Card information authentication request portion 408 may request remote server 200' to authenticate card information by decrypting individual area 154 that is recorded in the contactless IC chip 150'. The request for card information authentication may be made in response to input by a user of communication device 100'. For example, the request for card information authentication may be made by activating a financial transaction start program by a user via input/output portion 430. Alternatively, it may be determined that input by a user is made when communication device 100' is held over reader/writer 450 by a user.

Communication control portion 420 may be a communication interface that is configured by a communication device or the like for connection with a network such as the Internet, and it has a function to exchange data with remote server 200' or financial institution server 300' via the network. Communication control portion 420 may includes a card information reception portion 422, an authentication result reception portion 424, etc. Card information reception portion 422 may receive the card information of individual area 154 that is decrypted by remote server 200', and authentication result reception portion 424 may receive an authentication result of the card information transmitted from remote server 200' and personal identification number corresponding to the card information from financial institution server 300'. The personal identification number corresponding to the card information is information input by a user via input/output portion 430.

Input/output portion 430 is composed of input and output interfaces that are included in terminal device 400. Input/output portion 430 may include a personal identification number input portion 432. A user may input the personal identification number corresponding to the card information via personal identification number input portion 432. For example, the personal identification number may be input by a user through a ten-key pad or a touch panel placed on terminal device 400.

Remote server 200' may be substantially similar to remote server 200 of financial system 10. However, communication control portion 202 of remote server 200' may exchange data with terminal device 400 via the network. Area read portion 214 may read index area 152 and individual area 154 corresponding to the card information requested to be authenticated by terminal device 400 in response to a request for authenticating the card information from terminal device 400.

Card information acquisition portion 218 may decrypt index area 152 using the common encryption key that is recorded in storage portion 204 and may acquire the encryption key of the individual area. Card information acquisition portion 218 may further decrypt individual area 154 using the acquired encryption key and may acquire the card information that is contained in individual area 154. The card information that is acquired by the card information acquisition portion 218 may be transmitted to terminal device 400 by card information transmission portion 218 that is included in communication control portion 202. The functional configuration of the remote server 200' is described in the foregoing.

Financial institution server 300' may be substantially similar to financial institution server 300 of financial system 10. However, communication control portion 302 of financial institution server 300' may exchange data with terminal device 400 via the network. Card authentication portion 308 may authenticate card information based on card information that is transmitted from terminal device 400 and the personal identification number that is transmitted together with the card information.

The card authentication portion 308 may compare the card information and the personal identification number that are transmitted with the card information and the personal identification number that are recorded in the card information database 306 and may authenticate whether the card information and the personal identification number are correct or not.

Figure 14:
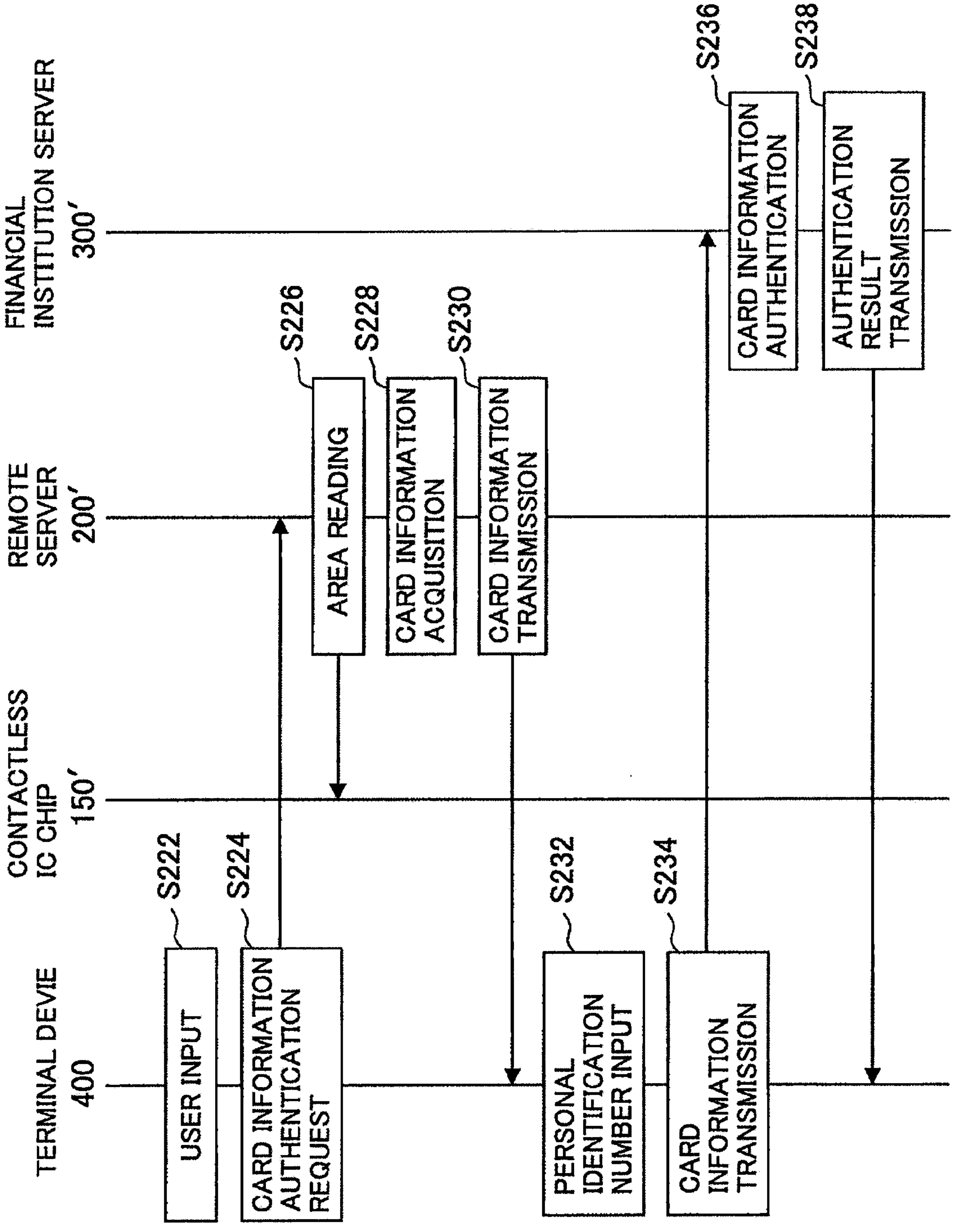
FIG. 14 illustrates a flowchart depicting a card authentication method implemented in a financial card issue system illustrated in FIG. 10.

FIG. 14 illustrates a flowchart depicting a card authentication method implemented in the financial card authentication system 20. First, a user may make a user input through input/output portion 430 of terminal device 400 (S222). The user input in step S222 may be to activate a card authentication request program of terminal device 400. A user may make a user input by holding the communication device 100' over the reader/writer 450. If the user input is made in step S222, the card information authentication request portion 408 of terminal device 400 may request remote server 200' to authenticate card information (S224).

Remote server 200' that is requested to authenticate the card information in step S224 may read index area 152 and individual area 154 in the storage portion of contactless IC chip 150' (S226). At this time, only the individual area 154 whose authentication is requested from the terminal device 400 may be read. Then, the card information may be acquired from index area 152 and individual area 154 that are read in step S226 (S228). Afterwards, the card information that is acquired in step S228 my be transmitted to the terminal device 400 (S230).

Terminal device 400 that receives the card information transmitted from remote server 200' in step S230 may then accept input of a personal identification number corresponding to card information (S232). In step 232, the transmitted card information may be displayed on a display of terminal device 400, so that a personal identification number corresponding to the displayed card may be input. Afterwards, the card information that is transmitted from remote server 200' in step S230 and the personal identification number that is input in step S232 may be transmitted to financial institution server 300' (S234).

Financial institution server 300' that receives the card information and the personal identification number transmitted in step S234 may authenticate the card information (S236). Financial institution server 300' that authenticates the card information in the step S236 may then transmit a result of authenticating the card information to terminal device 400 (S238). The authentication of the card information in step S236 is performed based on whether the card information and the personal identification number that are transmitted match the card information and the personal identification number that are recorded in the card information database 306.

If the card information and the personal identification number match the information stored in card information database 306 in step S236, the financial institution server 300' may notify that the card information is properly authenticated, and, if not, the financial institution server 300' may notify that the card information is not properly authenticated.

In financial card authentication system 20, remote server 200' acquires card information from index area 152 and individual area 154 that are recorded in the storage portion of contactless IC chip 150' in response to the card information authentication request from terminal device 400. Then, remote server 200' transmits the acquired card information to terminal device 400. Terminal device 400 may transmits the received card information and the personal identification number that is input by a user to financial institution server 300'.

Financial institution server 300' may authenticate the card information based on the transmitted card information and personal identification number. The card information that is written to contactless IC chip 150' of communication device 100' can be acquired only by remote server 200' that has the common encryption key for decrypting index area 152. Therefore, the security of the card information that is written to communication device 100' is high. Furthermore, because the card information that is written to contactless IC chip 150' is decrypted by remote server 200', it is not necessary for each financial institution to build a system for decrypting the encrypted card information. Furthermore, because a user only needs to input the personal identification number corresponding to the card information, which is the personal identification number of a cash card, it may be possible to conduct a transaction via the network in the same manner as a financial transaction using a normal ATM. It is therefore possible to conduct a financial transaction via the network without a user ID or a password for exclusive use in a transaction via the network.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention.

For example, although remote server 200' transmits the card information that is read by remote server 200' to terminal device 400, the present invention is not limited thereto. Alternatively, remote server 200' may transmit an authentication result and a transaction ID that uniquely identifies processing to terminal device 400. Then, remote server 200' may transmit the transaction ID transmitted to terminal device 400 and the card information to financial institution server 300'.

Terminal device 400 may then transmit the transaction ID transmitted from remote server 200' and an input personal identification number to financial institution server 300'. After receiving the transaction ID and the personal identification number from terminal device 400, financial institution server 300' may acquire the card information corresponding to the transaction ID. Financial institution server 300' may authenticate the card information based on whether the card information and the personal identification number that are acquired match the card information and the personal identification number that are recorded in card information database 306.

Computer programs based on the written description and methods of disclosed herein are within the skill of an experienced developer. The various programs or program modules can be created using any techniques known to one skilled in the art or can be designed in connection with existing software. The computer programs can be stored on a computer-readable storage medium, such as optical storage, magnetic storage, solid state storage, a CD, a DVD, a hard drive, RAM, ROM, a flash drive, and/or any other suitable computer-readable storage medium.

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure.

The limitations in the claims are to be interpreted based on the language employed in the claims and not limited to examples described in the present specification or during the prosecution of the application, which examples are to be construed as non-exclusive. It is intended, therefore, that the specification and examples be considered as exemplary only, with a true scope and spirit of the invention being indicated by the following claims and their full scope of equivalents.

What is claimed is:

1. A communication device incorporating an IC chip, wherein the communication device is connected to a financial institution server and a remote server through a network, the communication device comprising:

a card issue request portion for requesting the financial institution server to issue a first card;

a card information write request portion for receiving first card information corresponding to the first card from the financial institution server and requesting the remote server to write the first card information; and a storage portion comprising a first individual area, a second individual area, and a common area, wherein the first individual area stores the first card information and the second individual area stores second card information of a second card issued by the financial institution server, wherein a unique individual encryption key, unique to the first card information, is required to access the first card information in the first individual area, and wherein the common area stores an individual area identification number for identifying the first individual area and the individual encryption key, and the common area is accessible by using a common encryption key recorded in the remote server.

2. The communication device according to claim 1, wherein the remote server writes the encrypted first card information into the first individual area and writes the individual area identification number and the individual encryption key into the common area.

3. The communication device according to claim 1, wherein the common area is created by the remote server before a creation of the first individual area, and wherein a third individual area is created by the remote server for third card information when a request from the card information write request portion is made.

4. The communication device according to claim 1, wherein the common area stores individual area search information for searching for the first individual area, and wherein the individual area search information is a financial institution type in association with a card name.

5. The communication device according to claim 1, wherein the remote server encrypts the first card information and affixes a digital signature in response to a request from the card information write request portion.

6. The communication device according to claim 1, wherein the IC chip is capable of contact communication or contactless communication.

7. The communication device according to claim 1, wherein the storage portion is in the IC chip.

8. A communication device incorporating an IC chip, wherein the communication device is connected to a financial institution server and a remote server through a network, the communication device comprising:

a storage portion comprising a first individual area, a second individual area, and a common area, wherein the first individual area stores first card information corresponding to a first card issued by the financial institution server, wherein the second individual area stores second card information of a second card issued by the financial institution server, wherein a unique individual encryption key set, unique to the first card information, is required to access the first card information in the first individual area, and wherein the common area stores an individual area identification number for identifying the first individual area and the individual encryption key, and the common area is accessible by using a common encryption key recorded in the remote server;

a card information authentication request portion for requesting the remote server to authenticate the first card information by decrypting the first individual area;

a card information reception portion for receiving the first card information from the remote server;

a personal identification number input portion for accepting input of a personal identification number corresponding to the first card information;

a card information transmission portion for transmitting the first card information and the personal identification number to the financial institution server; and an authentication result reception portion for receiving an authentication result of authenticating the first card information and the personal identification number from the financial institution server.

9. The communication device according to claim 8, wherein the remote server acquires the individual area identification number and the individual encryption key and decrypts the first individual area by using the acquired individual encryption key.

10. The communication device according to claim 8, wherein the remote server transmits the first card information to the communication device when the first individual area is properly decrypted using the individual encryption key.

11. The communication device according to claim 8, wherein the financial institution server authenticates whether the first card information and the personal identification number transmitted from the communication device are in a proper combination.

12. The communication device according to claim 8, wherein the IC chip is an IC chip capable of contact communication or contactless communication.

13. The communication device according to claim 8, wherein the storage portion is in the IC chip.

14. A remote server, wherein the remote server is connected to a communication device and a financial institution server through a network, wherein the communication device incorporates an IC chip, wherein the IC chip comprises a first individual area, a second individual area, and a common area, and wherein the first individual area stores the first card information of a first card issued by the financial institution server, the remote server comprising:

a storage portion for recording a common encryption key used to access the common area, wherein the common area stores an individual area identification number for identifying the first individual area and an individual encryption key for accessing the first individual area;

an encryption portion for encrypting the first card information in response to a request for writing the first card information from the communication device;

an individual area write portion for writing the first card information encrypted by the encryption portion into the first individual area; and a common area write portion for writing the individual area identification number and the individual encryption key into the common area.

15. The remote server according to claim 14, further comprising a common area creation portion for creating the common area when the common area does not exist in the IC chip.

16. A remote server, wherein the remote server is connected to a communication device and a financial institution server through a network, wherein the communication device incorporates an IC chip, wherein the IC chip comprises a first individual area, a second individual area, and a common area, and wherein the first individual area stores first card information of a first card issued by the financial institution server, the remote server comprising:

a storage portion for recording a common encryption key used to access the common area, wherein the common area records an individual area identification number for identifying the first individual area and an individual encryption key for accessing the first individual area;

an area read portion for reading the common area and the first individual area in response to a request from the communication device to authenticate the first card information;

a card information acquisition portion for acquiring the individual encryption key by decrypting the common area by using the common encryption key and acquiring the first card information by decrypting the first individual area by using the individual encryption key; and a card information transmission portion for transmitting the first card information to the communication device.

17. A terminal device capable of contactless communication with a communication device incorporating a contactless IC chip through a reader/writer, wherein the terminal device is connected to a financial institution server and a remote server through a network, and wherein the IC chip comprises a first individual area, a second individual area, and a common area, the terminal device comprising:

a card issue request portion for requesting the financial institution server to issue a first card in response to user input; and a card information write request portion for receiving first card information of the card from the financial institution server and requesting the remote server to write the first card information, wherein the remote server writes the encrypted first card information into the first individual area, and the remote server writes an individual area identification number for identifying the first individual area and an individual encryption key used to encrypt the first individual area into the common area through the reader/writer.

18. A terminal device capable of contactless communication with a communication device incorporating a contactless IC chip through a reader/writer, wherein the terminal device is connected to a financial institution server and a remote server through a network, wherein the IC chip comprises a first individual area, a second individual area, and a common area, wherein the first individual area stores first card information of a first card issued by the financial institution server, wherein the common area stores an individual area identification number for identifying the first individual area and a unique individual encryption key for accessing the first individual area, and wherein the common area is accessible by using a common encryption key recorded in the remote server, the terminal device comprising:

a card information authentication request portion for requesting the remote server to authenticate the first card information by decrypting the first individual area;

a card information reception portion for receiving the first card information of the individual area decrypted using the common encryption key by the remote server;

a personal identification number input portion for accepting input of a personal identification number corresponding to the first card information;

a card information transmission portion for transmitting the first card information and the personal identification number to the financial institution server; and an authentication result reception portion for receiving an authentication result of the first card information and the personal identification number from the financial institution server.

19. A financial card issue system comprising a communication device comprising an IC chip, a financial institution server, and a remote server connected through a network, wherein the financial institution server comprises:

a card information transmission portion for transmitting first card information of a first card, to be issued in response to a first card issue request from the communication device, to the communication device, the communication device comprises:

a card issue request portion for requesting the financial institution server to issue the first card;

a card information write request portion for receiving the first card information from the financial institution server and transmitting a card information write request to the remote server to write the first card information; and a storage portion comprising a first individual area, a second individual area, and a common area, wherein the first individual area stores the first card information and the second individual stores second card information of a second card issued by the financial institution server, wherein a unique individual encryption key set, unique to the first card information, is required to access the first card information in the first individual area, wherein the common area stores an individual area identification number for identifying the individual areas and the unique individual encryption key, and wherein the common area is accessible by using a common encryption key recorded in the remote server, and the remote server comprises:

a second storage portion for recording the common encryption key;

an encryption portion for encrypting the first card information transmitted from the communication device in response to the card information write request;

an individual area write portion for writing the first card information encrypted by the encryption portion into the individual area; and a common area write portion for writing the individual area identification number and the individual encryption key into the common area.

20. A financial card issue system comprising a communication device comprising an IC chip, a financial institution server, and a remote server connected through a network, wherein the communication device comprises:

a storage portion comprising a first individual area, a second individual area, and a common area, wherein the first individual area stores first card information and the second individual area stores second card information of a second card issued by the financial institution server, wherein the common area stores an individual area identification number for identifying the first individual area and a unique individual encryption key required to access the first card information stored in the first individual area, and wherein the common area is accessible by using a common encryption key recorded in the remote server, a card information authentication request portion for transmitting a card authentication request to the remote server to authenticate the first card information by decrypting the first individual area;

a card information reception portion for receiving the first card information decrypted by the remote server;

a personal identification number input portion for accepting input of a personal identification number corresponding to the first card information;

a card information transmission portion for transmitting the first card information and the personal identification number to the financial institution server; and an authentication result reception portion for receiving an authentication result of the first card information and the personal identification number from the financial institution server, the remote server comprises:

a second storage portion for recording the common encryption key;

an area read portion for reading the common area and the first individual area in response to the card authentication request;

a card information acquisition portion for acquiring the individual encryption key by decrypting the common area by using the common encryption key and acquiring the first card information contained in the first individual area by decrypting the first individual area by using the individual encryption key; and a card information transmission portion for transmitting the card information to the communication device, and the financial institution server comprises:

a card information authentication portion for authenticating the first card information based on the card information and the personal identification number.

21. A financial card issue system comprising a terminal device capable of contactless communication with a communication device incorporating a contactless IC chip via a reader/writer, a financial institution server, and a remote server connected through a network, wherein the financial institution server comprises:

a card information transmission portion for transmitting first card information of a first card, to be issued in response to a first card issue request from the communication device, to the communication device, the communication device comprises:

a storage portion comprising a first individual area, a second individual area, and a common area, wherein the first individual area stores the first card information, and the first individual area is accessible by using an individual encryption key unique to the first individual area, and wherein the common area stores an individual area identification number for identifying the first individual area and the individual encryption key, and the common area is accessible by using a common encryption key recorded in the remote server, the terminal device comprises:

a card issue request portion for requesting the financial institution server to issue the first card in response to user input; and a card information write request portion for receiving the first card information from the financial institution server and requesting the remote server to write the first card information; and the remote server comprises:

a second storage portion for storing the common encryption key;

an encryption portion for encrypting the first card information in response to a card information write request from the terminal device;

an individual area write portion for writing the first card information encrypted by the encryption portion into the first individual area via the reader/writer; and a common area write portion for writing the individual area identification number and the individual encryption key into the common area.

22. A financial card authentication system comprising a terminal device capable of contactless communication with a communication device incorporating a contactless IC chip via a reader/writer, a financial institution server, and a remote server connected through a network, wherein the communication device comprises:

a storage portion a first individual area, a second individual area, and a common area, wherein the first individual area stores a first card information of a first card issued by the financial institution server, and the first individual area is accessible by using an individual encryption key unique to the first individual area, and wherein the common area stores an individual area identification number for identifying the first individual area and the individual encryption key, and the common area is accessible by using a common encryption key recorded in the remote server, the terminal device comprises:

a card information authentication request portion for transmitting a request to the remote server to authenticate the first card information by decrypting the first individual area;

a card information reception portion for receiving the first card information decrypted by the remote server;

a personal identification number input portion for accepting input of a personal identification number corresponding to the first card information;

a card information transmission portion for transmitting the first card information and the personal identification number to the financial institution server; and an authentication result reception portion for receiving an authentication result of authenticating the card information and the personal identification number from the financial institution server, the remote server comprises:

a second storage portion for storing the common encryption key;

an area read portion for reading the common area and the first individual area via the reader/writer in response to the request to authenticate from the terminal device;

a card information acquisition portion for acquiring the individual encryption key by decrypting the common area using the common encryption key and acquiring the first card information by decrypting the first individual area using the encryption key; and a card information transmission portion for transmitting the first card information to the terminal device, and the financial institution server comprises:

a card information authentication portion for authenticating the first card information based on the first card information and the personal identification number transmitted from the terminal device.

23. A computer-readable storage media storing a program for causing a computer to execute a method, the method comprising:

requesting a financial institution server to issue a first card;

receiving first card information corresponding to the first card from the financial institution server;

requesting a remote server to store the first card information;

storing the card information in a first individual area of an IC chip incorporated into a communication device, wherein the first area is accessible by using an individual encryption key unique to the first individual area; and storing an individual area identification number for identifying the first individual area and the individual encryption key in a common area of the IC chip, wherein the common area is accessible by using a common encryption key recorded in a remote server.

24. A computer-readable storage media storing a program for causing a computer to execute a method, the method comprising:

storing first card information corresponding to a first card issued by a financial institution server in a first individual area of an IC chip incorporated into a communication device, wherein the first area is accessible by using an individual encryption key unique to the first individual area;

storing an individual area identification number for identifying the first individual area and the individual encryption key in a common area of the IC chip, wherein the common area is accessible by using a common encryption key recorded in a remote server;

requesting the remote server to authenticate the first card information by decrypting the first individual area;

receiving the first card information stored in the first individual area decrypted by the remote server;

accepting input of a personal identification number corresponding to the first card information;

transmitting the first card information and the personal identification number to the financial institution server; and receiving an authentication result of the first card information and the personal identification number from the financial institution server.

25. A computer-readable storage media storing a program for causing a computer to execute a method, the method comprising:

recording a common encryption key used to access a common area of an IC chip, wherein the IC chip is incorporated into a communication device;

encrypting first card information, corresponding to a first card issued by a financial institution server, in response to a request for writing the card information from the communication device;

writing the first card information into a first individual area of the IC chip; and writing an individual area identification number used for identifying the first individual area and a unique individual encryption key used to access the first individual area into the common area.

26. A computer-readable storage media storing a program for causing a computer to execute a method, the method comprising:

recording a common encryption key used to access a common area of an IC chip, wherein the IC chip is incorporated into a communication device;

reading the common area and a first individual area corresponding to first card information in response to a card request to authenticate the first card information from the communication device, wherein first individual area of the IC chip stores the first card information corresponding to a first card issued by a financial individual server, and the first individual area is accessible by using an encryption key unique to the first individual area;

acquiring the encryption key of the first individual area by decrypting the common area by using the common encryption key;

acquiring the first card information by decrypting the first individual area by using the encryption key; and transmitting the first card information to the communication device.

27. A computer-readable storage media storing a program for causing a computer to execute a method, the method comprising:

requesting a financial institution server to issue a first card in response to user input;

receiving first card information corresponding to the card from the financial institution server; and requesting a remote server to write the first card information, wherein the remote server stores the first card information in a first individual area of an IC chip, wherein the first individual area is accessibly by using an individual encryption key unique to the first individual area, wherein the individual encryption key is stored in a common area of the IC chip, and wherein the common area is accessible by using a common encryption key stored by the remote server.

28. A computer-readable storage media storing a program for causing a computer to execute a method, the method comprising:

requesting a remote server to authenticate first card information by decrypting a first individual area in an IC chip, wherein the first individual area stores the first card information corresponding to a first card issued by a financial individual server, and the first individual area is accessible by using an encryption key unique to the first individual area, and wherein the IC chip is incorporated into a communication device;

receiving the first card information decrypted using the common encryption key by the remote server;

accepting input of a personal identification number corresponding to the first card information;

transmitting the first card information and the personal identification number to the financial institution server; and receiving an authentication result of the first card information and the personal identification number from the financial institution server.

* * * * *